United States Patent [19]
Fischer

[11] Patent Number: 5,748,960
[45] Date of Patent: May 5, 1998

[54] METHOD AND APPARATUS FOR VALIDATING TRAVELLING OBJECT-ORIENTED PROGRAMS WITH DIGITAL SIGNATURES

[76] Inventor: Addison M. Fischer, 4073 Merchantile Ave., Naples, Fla. 33942

[21] Appl. No.: 769,118

[22] Filed: Dec. 18, 1996

Related U.S. Application Data

[63] Continuation of Ser. No. 103,778, Aug. 10, 1993, abandoned.

[51] Int. Cl.⁶ .................................................. G06F 13/00
[52] U.S. Cl. ................................................................ 395/683
[58] Field of Search ........................................ 395/683, 684

[56] References Cited

U.S. PATENT DOCUMENTS

| | | |
|---|---|---|
| 4,868,877 | 9/1989 | Fischer . |
| 5,001,752 | 3/1991 | Fischer . |
| 5,005,200 | 4/1991 | Fischer ........................ 380/30 |
| 5,095,522 | 3/1992 | Fujita et al. . |
| 5,218,706 | 6/1993 | Komori et al. . |
| 5,265,206 | 11/1993 | Shackelford et al. . |
| 5,280,610 | 1/1994 | Trabis, Jr. et al. ............... 364/DIG. 1 |
| 5,283,898 | 2/1994 | Kusumoto et al. . |
| 5,305,461 | 4/1994 | Feigenbaum et al. . |
| 5,311,591 | 5/1994 | Fischer ........................ 380/4 |
| 5,325,478 | 6/1994 | Shelton et al. . |

(List continued on next page.)

FOREIGN PATENT DOCUMENTS

| | | |
|---|---|---|
| A-0 457 684 | 11/1991 | European Pat. Off. . |
| A-0 520 749 | 12/1991 | European Pat. Off. . |
| A-0 565 314 | 10/1993 | European Pat. Off. . |

OTHER PUBLICATIONS

Beck, Leland L., "System Software — an introduction to programming", Addison–Wesley Publishing Company, Mar. 1990, p. 292.

Messmer, Ellen, "NIST" proposes standard for electronic signatures, Network World, p. 4.

Computer Communications, vol. 14, No. 6, Jul. 1991, Guildford GB pp. 358–365, C Horn & V. Cahill, "Supporting Distributed Applications In The Amadeus Environment", p. 360, Left Column, Lines 1–25.

IBM Technical Disclosure Bulletin, vol. 34, No. 6, Nov. 1991, pp. 423–425, "Accessing Remote Data Services Through An Object–Oriented Language".

*Primary Examiner*—Thomas M. Heckler
*Attorney, Agent, or Firm*—Nixon & Vanderhye P.C.

[57] ABSTRACT

A method of operating computers in accordance with an enhanced object-oriented programming methodology creates a framework for efficiently performing automated business transactions. The object-oriented programming methodology is used in conjunction with a travelling program, i.e., a digital data structure which includes a sequence of instructions and associated data which has the capability of determining at least one next destination or recipient for receiving the travelling program and for transmitting itself, together with all relevant data determined by the program to the next recipient or destination. The data is closely bound to the program in such a way that objects may be most efficiently transferred from one computer user to another without the objects being previously known to the recipient computer user. Object "cells" or "electronic forms" which are data structures stored, for example, on a disk that reflects a collection of (related) objects instances whose execution has been suspended, and which can be resumed later on the same or a different platform are constructed and used. Improved tools are provided for creating and using cells so that electronic forms can be defined using object-oriented techniques while allowing such forms to be easily transferred among a diverse population of computer users. A digital signature methodology is employed to insure security and integrity, so that electronic forms (i.e., cells) composed of a collection of objects can be received and executed by a user without putting the user at risk that some of the object classes embedded in the cell might be subversive programs.

95 Claims, 23 Drawing Sheets

U.S. PATENT DOCUMENTS

| | | |
|---|---|---|
| 5,327,559 | 7/1994 | Priven et al. . |
| 5,337,360 | 8/1994 | Fischer .................................. 380/23 |
| 5,341,478 | 8/1994 | Travis, Jr. et al. ................ 364/DIG. 1 |
| 5,367,573 | 11/1994 | Quimby . |
| 5,390,247 | 2/1995 | Fischer ..................................... 380/25 |
| 5,404,525 | 4/1995 | Endicott et al. ......................... 395/700 |
| 5,412,717 | 5/1995 | Fischer ..................................... 380/4 |
| 5,440,744 | 8/1995 | Jacobson et al. ........................ 395/650 | cellBlock ~11

| | | |
|---|---|---|
| 12 — | nextCell: | —> Next cellBlock |
| 14 — | globalPool: | Pool head for global variables |
| 16 — | cellIdent: | cell identification |
| 18 — | cellFace Instance | (pointer to instance for handling outside requests) |
| 19 — | pointers to file and certificate tags | |
| 20 — | classTable Pointer to classes for this cell | |
| 22 — | cellSignature: | —> digital signature structure for cell as it existed when cell received |

Fig. 2 classBlock ~23     Fig. 3

| | | |
|---|---|---|
| 25 — | classLink | link for other classBlocks in Cell |
| 24 — | parentClass | —> classBlock from which this is extended |
| 26 — | numLevels: | = number of classes in total lineage |
| 28 — | className | Name of this class |
| | classpgm | to program block of associated program |
| | method Table: | —> table of valid methods for lookup: |

Each method entry has the format:

| |
|---|
| Linkage for other entries in table |
| —> classBlock associated with definition of method |
| Offset of start of pCode for method in associated classProgram |
| Length of method name |
| Name of method (normalized to lower case) |

34

| |
|---|
| classAuth: —>authenticated authorization structure |
| lowest and highest levels of program making processable instances |

36

Fig. 6 execBlock ~62

| 64 | nextInstr: | –> next pCode instruction |
|---|---|---|
| 66 | classPtr: | –> classBlock |
| 68 | instanceExec: | –> instance being executed |
| 70 | localPool: | –> pool for local variables |
| 72 | prevExecBlock: | –> Previous execBlock |

Fig. 7

73 ~ instanceValue

| 74 | classRef: | –> classBlock for instance's class |
|---|---|---|
| 76 | cellRef: | –> cellBlock for this instance |
| 78 | pendDelete: | = 1 if "DELETE" has been directed to instance |
| 79 | sequence #: | identifies last store operation |
| 80 | execCount: | Number of active execBlocks for this instance |
| 81 | scan indicators: | identifies particular save operation |
| 82 | useCount: | Number of pointers to this block (includes variables, FACE INSTANCE, etc.) |
| 84 | levelCount: | (Equal to numLevels in associated classBlock) |
| 86 | sharedPool: | Pool head for SHARED variables |
| 88 | privatePools: | Pool head for private variables of eldest parental class |
|  |  | Pool head for private variables of next eldest class |
|  |  | ••• |
|  |  | Pool head for private variables of youngest class |

Program Reference: 151

Cell: 118

178 — VariablePool:

Fig. 11F

Variable:

| |
|---|
| 183 — Variable Name |
| 184 — Variable Value:<br>　If variable is a STRING,<br>　　　then this is an OCTET STRING<br>　If variable is an INSTANCE within this SAME CELL,<br>　　　then this is an INTEGERindex within InstanceVector<br>　If variable is an INSTANCE within a DIFFERENT cell,<br>　　　then this is a SEQUENCE of INTEGERs:<br>　　　　　the INTEGER index within instanceVector<br>　　　　　the INTEGER index within CellVector.<br>　If variable is a STEM  variable with no assigned value,<br>　　　then this is a NULL item.<br><br>(If this is a simple (non-STEM) variable with no assigned value<br>then the variable item is not included at all.) |

CellIdentifier 156

| |
|---|
| 186 — Cell Format Code ( = 0 for first implementation) |
| 187 — Moment of construction (date, time cell was built) |
| 188 — Cell Category Identifier (X.209 object identifier)<br>　　　(X.209 object identifier for type of cell in an application) |
| 189 — Cell category Name (to display application classification) |
| 190 — Cell Instance Identifier (X.209 object id for this individ<br>　　　(X.209 object id for this individual cell) |
| 191 — Cell Instance Name (to quickly display cell's unique name) |
| 192 — Cell Instance Title (more instance detail for display) |
| 193 — Cell Instance Qualifiers (more information to identify cell) |

| |
|---|
| 194 — First Qualifier |
| 195 — Second Qualifier |
| • • • |
| 196 — Last Qualifier |

Fig. 11G

EstablishClassAuthorization Fig. 16
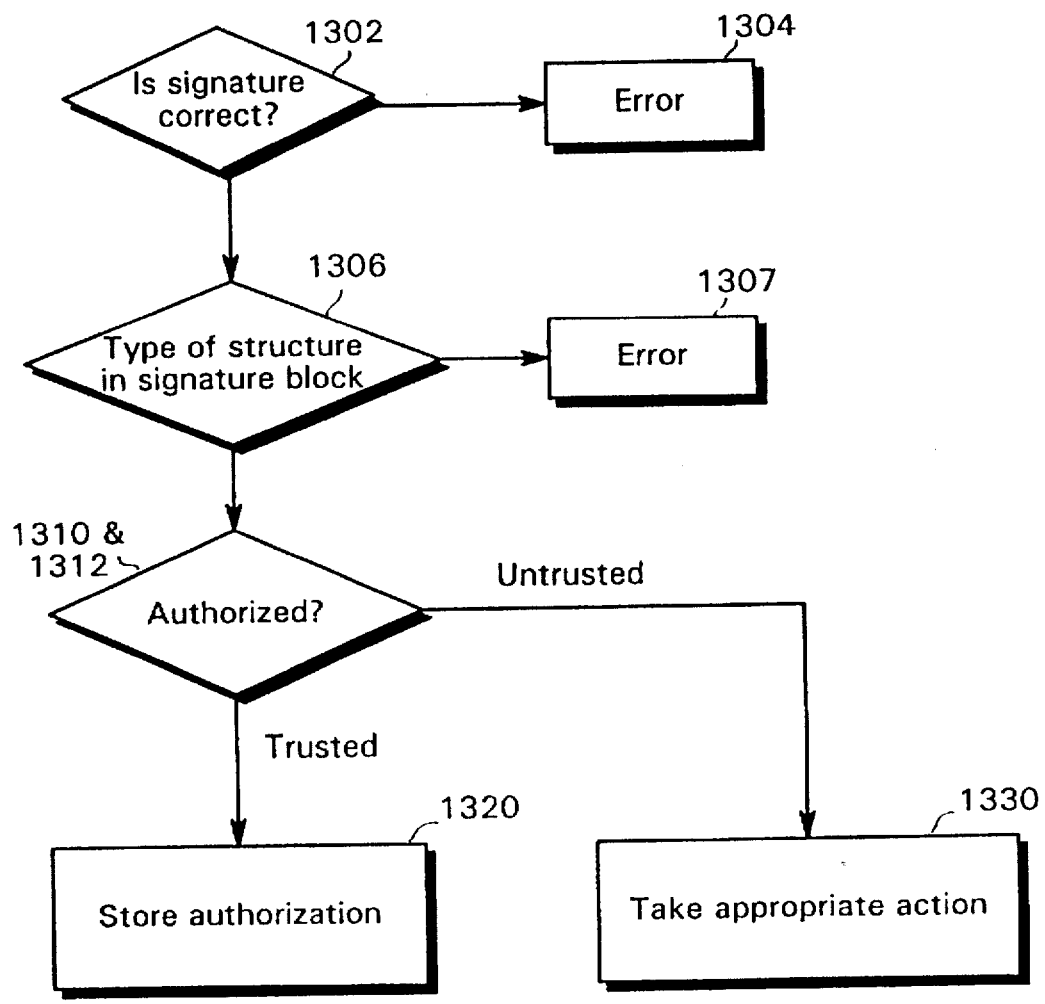

Exit Method

Delete Instance

METHOD AND APPARATUS FOR VALIDATING TRAVELLING OBJECT-ORIENTED PROGRAMS WITH DIGITAL SIGNATURES

This is a continuation of application Ser. No. 08/103,778, filed Aug. 10, 1993, now abandoned.

FIELD OF THE INVENTION

The invention generally relates to apparatus and a method for operating digital computers under the control of object-oriented programs. More particularly, the invention relates to a method and apparatus for validating unique travelling object-oriented programs using digital signature methodology.

RELATED APPLICATIONS

This application is related to allowed application Ser. No. 07/863,552 filed on Apr. 6, 1992, entitled, "Method and Apparatus for Creating, Processing and Using Travelling Programs" (hereinafter "Travelling Program Application") and to application Ser. No. 07/883,868, now U.S. Pat. No. 5,412,717, entitled "Computer System Method and Apparatus Using Program Authorization Information (hereinafter "Program Authorization Information Application").

BACKGROUND AND SUMMARY OF THE INVENTION

The present invention is directed to apparatus and method for operating a digital computer in accordance with a powerfully enhanced object-oriented programming methodology.

In object-oriented programming using existing object-oriented languages, such as, "C," and "Small Talk," programmers are able to define object "data types" (or "classes") which are data structures each associated with a program that knows how to process that data type. Object-oriented programming permits existing programs to be reused and extended without having to modify the program. This feature of object oriented programming is known as the "inheritance feature" and is the ability to define new data type classes derived as "extensions" of other (more fundamental) data classes.

The extension class only needs to define those functions (known as the object's "methods") for the new data type which differ from the existing ("base") class. Such methods may be entirely new or may supersede (by replacing or augmenting) methods defined for the base class. This simplifies the creation of novel variations of existing data classes, either by adding new functions or by superseding (modifying) existing functions.

Some object-oriented methodologies allow "multiple inheritance" whereby there can be more than one "base" class from which a given class inherits characteristics. The present invention contemplates the possible use of multiple inheritance. The lineage of a given class is the aggregate set of its base class(es) together with the base class' lineage.

Using more conventional "procedural" programming methodologies, different data types are processed in different manners based upon processing rule defined for the data type. Object-oriented programming provides a different processing methodology. Each individual occurrence of a programmer-defined object data type or class is known as an "instance" of that class. Once a class is defined, then its data type can be used over and over again in different programs with no extra programming effort.

The class program definition for each data type defines the functions that can be applied to instances of that data type. Programs use objects by invoking one of the objects methods (i.e., the functions that can be applied to instances of that data type) in conjunction with a particular instance of that object. The method then processes that particular instance of data.

Thus, one of the strengths of object-oriented programming methodology is that the same method name can be implemented differently in different data type classes. An application program can perform a generic" operation on data without having to be concerned about exactly how it is implemented. This facilitates the addition of new varieties (classes) of data types with minimal changes, if any, to application programs using these types.

The logic to perform these "methods" is built into each data class once. In this fashion, the way in which programs use such data types is simplified by allowing different data types to each implement a particular function in a way appropriate to that data type.

Object-oriented programming thus provides a different methodology for compartmentalizing programs which is highly useful in many different complex application areas. In object-oriented programming, data is not typically treated as an isolated bitstream, but rather, it is bound to a program which manages the data.

This feature of object-oriented methodologies—the ability to have a particular function operate differently on a variety of data types—is known as "polymorphism."

Polymorphism permits a program to operate on data without being concerned with what that data represents. The polymorphic feature of object-oriented methodology permits a particular operation to be implemented in different ways depending upon the data type so that the function will be performed appropriate to that data type. An example of polymorphism may, for example, involve a "multiply" operation. For real scalar data types, two scalars are arithmetically multiplied together. But for matrix data types, the "multiply" method could be implemented to yield the more involved "matrix" multiplication. By treating these as objects, program designers can use multiplication without worrying about whether the particular operands were real numbers or matrices. Then, at some future time, for example, a new "complex" number data type with yet a different multiply mechanism could be introduced into existing programs with no further programming effort.

Another example of object-oriented methodology may involve objects associated with a graphical display. Most of such objects would have a "quick" click method that would be invoked whenever the mouse pointer lies atop the object's associated graphical image and the user clicks the mouse switch.

Consider graphical display of a group of buttons. Each "button" graphic may be represented and controlled by a separate instance of the "button" class. Other types of graphical items, such as data fields, will be controlled with instances of their own respective classes. It would be possible to treat an "icon" as a special class of "button" but one which has additional or modified characteristics.

In developing the "icon" class as an extension of "button," all of the method routines for "button" would be effective for the "icon" class, except those which are specifically supplied for the distinct "icon" class definition. Whenever the user clicks the mouse switch, the system determines the items over which the mouse appears to be positioned and invokes the "click" method for the object instance associated with that graphical item.

Different functions such as "scroll contents up," "delete this object," "print contents," or "handle mouse-button-click request" may be interpreted differently depending upon the particular graphical object involved. Allowable functions are defined when the data is defined, not each time the data is used.

The present invention is directed to significantly enhanced object-oriented programming methodologies which create a framework for efficiently performing automated business transactions. The object-oriented programming methodology of the present invention is particularly useful in the context of the applicant's "travelling program methodology" described in the above-identified Travelling Program patent application, which has been expressly incorporated in its entirety by reference herein.

A travelling program is a digital data structure which includes a sequence of instructions and associated data which has the capability of determining at least one next destination or recipient for receiving the travelling program and for transmitting itself, together with all relevant data determined by the program to the next recipient or destination. Using the methods described herein, the data is more closely bound to the program in such a way that objects may be most efficiently transferred from one computer user to another without the objects being previously known to the recipient computer user.

The present invention permits data to be structured and maintained as an object with the highest degree of security and stored and sent around from one computer user to another.

The present invention also permits application programs to be developed more efficiently than heretofore possible through the efficient creation of reusable programming pools. Using the present invention, individual objects may be transferred to other user destinations as desired.

The present invention utilizes object "cells." A cell is a data structure stored, for example, on a disk that reflects a collection of (related) objects instances whose execution has been suspended, and which can be resumed later on the same or a different platform. The collection of object instances can be gathered together into cells (or "electronic forms") suitable for storage or transmission to another computer user in such a way that instances are unambiguously bound to their respective class definition.

The present invention provides the useful capability of permitting an electronic form to be built up from arbitrary object-oriented data class components with the data class definition programs being transmitted as part of the electronic form together with the underlying object instances values.

The present invention also creates improved tools for creating and using cells (electronic forms) so that electronic forms can be defined using object-oriented techniques while allowing such forms to be easily transferred among a diverse population of computer users—without demanding that all users maintain compatible libraries of all object-class definition programs and without demanding that all users maintain identical synchronized versions of that class.

Thus, the present invention facilitates the transfer of such a cell via electronic mail to another user without concern as to whether the recipient has all the necessary object classes, or whether such classes reflect the version properly corresponding to the particular data transfer. The cells may be invoked as objects by other cells.

The invention provides a digital signature methodology to insure security and integrity, so that electronic forms (i.e., cells) composed of a collection of objects can be received and executed by a user without putting the user at risk that some of the object classes embedded in the cell might be subversive "trojan horse" programs that might steal, destroy or otherwise compromise the security or integrity of the user's system or data.

Indicia is stored in the object instances themselves to locate the associated class definition program. This includes, for example, the name of the object class instance.

Unique ways are described herein of binding data instances stored in a cell to their respective object class programs such that the correct, compatible, class definition program is assured of operating on the existing instance data when the cell is reloaded from storage when commencing subsequent execution.

This provides integrity by insuring that changed "library" or template versions of a class program cannot inadvertently operate on older instance data; or that other incorrect versions of a class program cannot be inadvertently used (and cause confusion or damage) when a cell is activated at different times by a variety of users (recipients) [even if one of the users may have a class program with a matching name]. The unambiguous binding between instance and class may be provided in a variety of ways including:

- by binding an object instance in a cell to its class by including the class definition—i.e., the class program logic itself, whether it be in source, p-code or machine code—as part of the cell data structure.
- By binding an object instance in a cell to its class by including in the cell a [cryptographic] HASH of at least one of: the SOURCE instructions (or normalized version thereof); the pseudo-code (p-code) instructions resulting from compilation; or the machine language code resulting from compilation—for the class program definition.

This binding correlates to each instance with precisely the correct corresponding class program—so that another class with the same name, or an anachronistic version (too old or too new) of the class—cannot be inadvertently selected to operate on the existing version of instance data, when the cell is reloaded. This is especially useful for class programs that perform critical or sensitive functions. In this fashion, "master" class definitions may be changed without impairing or confusing existing instances that depend on the specification of the class definition at the time the instance was created.

In accordance with the present invention, critical portions of the cell may be digitally signed so that they cannot be accidentally or mischievously altered between the time the cell is stored and it is reused (possibly by another user). However, non-critical portions of the cell are not digitally signed so that they can be adjusted to accommodate the optional inclusion or exclusion of non-critical information, or information which can be validated in other ways. Thus, object program CLASS definitions can be stored in a digitally signed format so they cannot be corrupted. In some environments, not all object class definition programs need to be digitally signed—only the ones which perform critical operations. (Such as accessing files; or invoking external programs written in assembler language, C language, or other modules which execute outside of direct interpreter control).

Such critical portions typically include: the structure and values of the data and objects, coupled with at least an unambiguous binding to at least one compatible version of each critical object class program definition—usually including the hash value of a version of the program.

The present invention contemplates that each class can be further digitally signed in conjunction with the authorization defining the operations or functions which that class is permitted to perform. This authorization is defined by a program authorization information data structure as described in above-identified copending application U.S. Ser. No. 07/883,868, now U.S. Pat. No. 5,412,717, entitled "Computer System Method and Apparatus Using Program Authorization Information." This application has been expressly incorporated herein by reference.

This allows automatic detection of corrupted or malicious cells. It also provides the safety feature to insure that untrusted classes (instances) do not have the capability (either through program faults, or deliberate mischief) to cause damage. This allows means to MIX TRUSTED and UNTRUSTED classes—providing the ability to use casual instances (and classes) to supply innocuous or do limited function in conjunction with more powerful classes—assuring that the untrusted classes can do nothing surreptitiously. This also provides the capability to guard against object-oriented analogies to the Morris Internet virus/worm which was able to cause untrusted code to operate in a trusted state.

Using this methodology, the image of the class (either source, p-code, or otherwise) can be inserted or removed from the cell after it is digitally signed, without impairing the integrity of the cell.

The present invention also provides methodology so that versions of a class program are able to process instances which were created by different versions of the class program. This is done by associating with the data instance the version of the class program that created it (or last manipulated it), and by allowing each version of the class program to specify the set of data versions which it supports.

The present invention provides a methodology for repair or upgrade of an existing cell, whereby the class definition stored or referenced by the existing cell can be extracted and replaced with a revised (or corrected) definition—yet without sacrificing integrity even if the cell has been digitally signed.

It provides a methodology whereby one cell (electronic form), composed of a variety of objects, can be stored and restored to execution on the same or other computers.

It permits entire cells themselves to be invoked and processed as objects by other cells. This allows the cross-merging of data and processing from cell to cell; and the means for handling complex systems of cells in which the cell themselves interact. It permits cells to cause their own transmission from user to user through the use of electronic mail or other services. It allows the inclusion of cells within other cells, as well as the ability of a cell to later re-separate interior cells. The invention also allows an isolated portion of its interior objects to be isolated and used to create a subcell.

The invention teaches how various classes to be written in different languages (such as "BASIC" and "REXX," for example) can yet be combined into a common object cell. The invention teaches how disparate languages, such as REXX and BASIC can be combined so that a class defined using one programming language can be extended from a class written in another language.

In another aspect of the invention, programs can create, process and manipulate objects for which either the class, the methods, or both, are dynamically determined independently (and after) either the specification or compilation of the program. This is possible because both the class and method names are controlled by string values, which permits them to be dynamically determined based on any inputs, decision and string manipulations.

Therefore, objects may be created based strictly on names—which may be entered as data by a user, computed dynamically based on run time values, or read from a file. Another aspect of the invention is that class binding is performed at execution time as they are used—so that no special "linkage editing" step is required to bind various classes into an "executable" module.

The present invention advantageously permits object oriented programs to be combined with travelling programs to allow travelling programs to be constructed using object oriented techniques. It permits travelling programs to be processed as objects themselves [by other travelling programs].

The present invention permits digital signatures to be used with travelling objects so that associated class [program] definitions cannot be corrupted, manipulated, or altered in definition. It permits digital signature technology to be used for security and integrity purposes to limit the computer and data resources that can be processed by instances of particular object classes, and the type of processing that can be done.

It permits a network of computer users to exchange data containing a plurality of object instances such that:

the recipient can safely perform at least one of the methods in the transmitted object instances, without danger of malicious damage or compromise of the recipient's data.

One of the features of this invention is the ability to develop programs in which data variables are not inherently bound to a particular object class. The present invention allows a programmer to develop programs in which the class of variables can be freely changed during the execution of the program to reflect any object class—even those which were not contemplated at the time the program was written.

Another feature of this programming invention is the ability for different instances of the same object to possess substantially different sets of associated data fields.

Another feature of this invention is the ability whereby a collection of mutually associated instances, typically associated with several classes, can be written from their execution state into a saved data file; this is done in such a way that the programs which define the instances' classes are themselves unambiguously bound into the saved data file. In this invention, such a saved data file shall be called a "cell."

This invention allows the proper reloading of a cell so that all instances, data associated with the instances, and the programs associated with the instances are recovered with full fidelity so that execution processing of the overall cell can commence at some future time.

A feature of this invention is that the cell can be treated as an object itself, so that the execution state associated with the cell at the time of its saving can be invoked at some later time.

In the present embodiment of the invention, in each cell there is one particular object instance which is considered the "face" of the cell. Whenever a request is made to a cell to perform a method, it is the method of the face instance which is activated. Hence, whereas a cell may contain many constituent instances, it is the face instance which is responsible for handling requests for overall cell activity.

It is a feature of this invention that the language in which the classes are defined is not specific to one computer type, and that it may be processed or interpreted across a broad range of different computer architectures and operating systems.

It is a feature of the invention that the actual logic defining the object classes may be stored in and carried as part of a stored cell. This serves at least two benefits:

the cell retains integrity even if the associated class-defining program is changed. In other art, where the class-definition is only loosely coupled to its instances, it is dangerous to ever change (or "improve") the program, since such changes may give different meaning to existing data variables, introduce new variables, or eliminate old variables—in such a way that processing "old" data with the new program is apt to yield program dysfunction or incorrect and misleading results.

This allows the cell to be transmitted to another computer and executed there without concern for whether:

the class-defining program is available on the other computer;

whether the reference class-programs as found on the recipient's computer are compatible with the data instances as built within the cell.

It is a feature of the invention that the logic of at least one of the associated class definitions may be uniquely identified in the stored cell by the hash of the associated program. This serves different purposes than storing the program definition itself:

It allows cells to be stored in smaller space without duplicating the class program in each cell, yet still insures exact integrity without storing an image of the program. This is accomplished during cell reload, when the actual hash is recomputed and compared with the expected hash.

This insures that no software changes (deliberate, accidental, or malicious) can inadvertently lead to misexecution, yet it does not demand the storage overhead of duplicating copies of frequently used classes repeatedly in many cells.

For commonly used classes, such as those which may be widely distributed through a given enterprise, it is reasonable to suppress transmission of the program itself—yet the hashes of the class programs are valuable to insure integrity by preventing a wrong class program from even being used. Whenever a class program is loaded, its hash is computed and compared with its expected value.

If a cell does not contain the class definition image, and there is no image available at reload that agrees with the hash, then the hash can be used to locate the correct class definition and to confirm correctness when found. This strategy is effective even if the correct definition is recovered from offline, archived storage. Once all the correct class definitions are recovered and made available online, then re-execution of the cell can commence.

BRIEF DESCRIPTION OF THE DRAWINGS

These and other features and advantages of the present invention will become more apparent in light of the detailed description of the following FIGURES of which:

FIG. 2 is a representation of the "cell block" data structure in accordance with an exemplary embodiment of the present invention.

FIG. 3 is a representation of a "class block" data structure in accordance with an exemplary embodiment of the present invention.

FIG. 6 is an exemplary "execution block" data structure.

FIG. 7 is an exemplary "instance value" data structure.

FIGS. 11A through 11K are expanded data structures associated with the stored cell.

FIG. 16 is a flowchart delineating the sequence of operations and establishing a class authorization.

DETAILED DESCRIPTION OF THE PREFERRED EMBODIMENT

Figure 1:
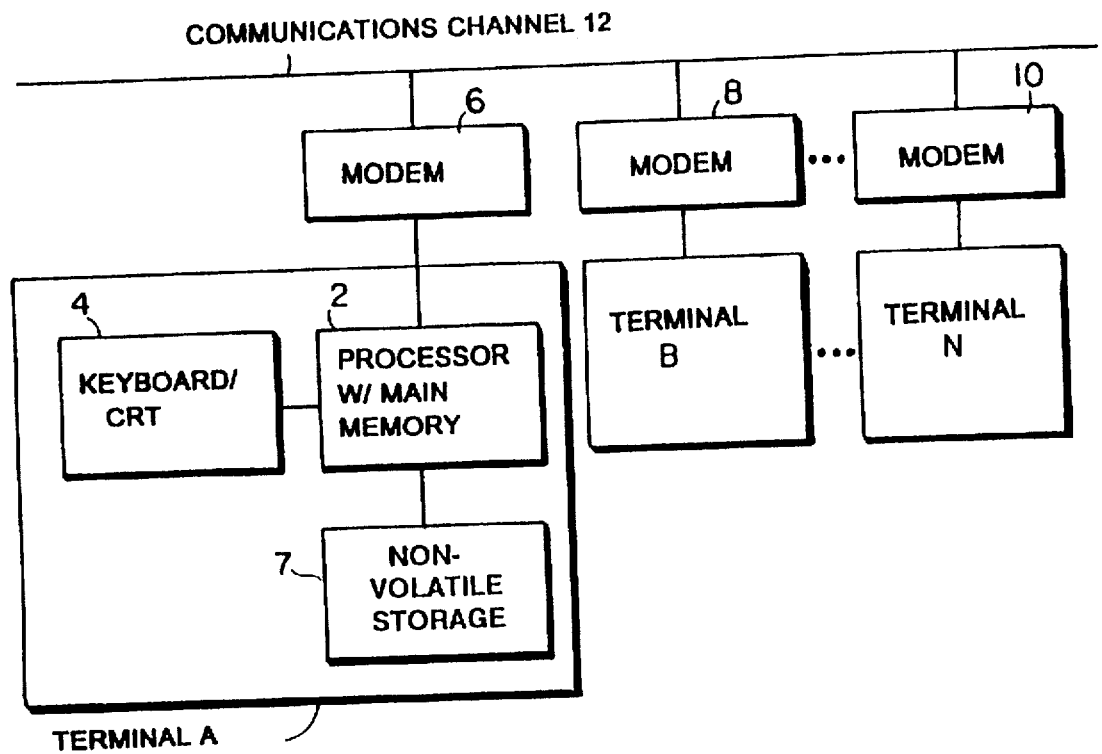
FIG. 1 is a block diagram showing an exemplary communication system which may be used in conjunction with the present invention.

FIG. 1 is a block diagram showing an exemplary communication system which may be used in conjunction with the present invention. The system includes a communications channel 12 over which communication between terminals A, B, . . . N may take place. Communication channel 12 may, for example, be an unsecured communications channel such as a telephone line. Terminals A, B, . . . N may, by way of example only, be IBM-PC compatible computers having a processor (with main memory) 2, which is coupled to a conventional keyboard/CRT display 4. The processor with main memory 2 is also coupled to a nonvolatile storage 7, which may be a disk memory. Each terminal A, B, . . . N also includes a conventional IBM-PC communications board (not shown) which, when coupled to a conventional modem (6, 8, 10, respectively), permits a terminal to transmit and receive messages including travelling programs.

As used herein and as described in detail in the Travelling Program application Ser. No. 07/863,552, which has been incorporated herein by reference, a travelling program is a digital data structure which includes a sequence of instructions and associated data which has the capability of determining at least one next destination or recipient for receiving the travelling program and for transmitting itself together with all relevant data determined by the program to the next recipient or destination. An exemplary travelling program data structure is shown in FIG. 2 of the Travelling Program Application. The data structures utilized during the execution of a travelling program and the software for executing the travelling program are described in the Travelling Program Application and incorporated herein by reference.

Each terminal A, B, . . . N is capable of generating a message and performing whatever digital signature operations may be required to load and execute the logic, data, and functions inherent within the travelling program in transmitting the message to other terminals connected to communications channel 12 (or to a communications network (not shown) which may be connected to communication channel 12). The enhanced digital signature and certification methodology described in the inventor's U.S. Pat. Nos. 4,868,877; 5,005,200 and 5,001,752 may be used herein, which patents are expressly incorporated herein by reference. Alternatively, more conventional digital signature methodologies may be utilized.

This invention's enhancement of object-oriented programming techniques is particularly well suited and designed to facilitate the travelling program methodologies that are described in the applicant's allowed application Ser. No. 07/863,552. However, the present invention also significantly enhances the ability to efficiently generate applications programs and thus has great utility if only used in conjunction with a single computer user.

The present invention utilizes discrete files, or electronic forms called "cells." These cells represent a package of objects which are essentially self contained and are a collection of instances whose execution can be suspended and stored as a file. A cell can be later reloaded (either by the same user or another) into main computer memory where execution can be resumed at a then-designated method.

In the presently preferred embodiment, data classes are defined in modified versions of the high-level programming languages, such as REXX, or the well known BASIC language. These languages have been converted from a procedural high-level programming language to the unique object-oriented extension as described herein. The object-oriented extensions to the high-level language provide ways to define a program's class and specify the base classes (if any) from which this class is extended (by inheritance) to define the various methods associated with a particular class (for polymorphism) to distinguish the scope of program variables, and to easily create, invoke and process other objects instances.

The cell may be viewed as a set of data, i.e., an electronic form that inherently includes within it all the programs which are associated with that information and controls how to manipulate the information. Within a cell may be collections of programs which may be treated as a single variable. For example, a cell may include a name and address field which would be an object that may have associated classes. The associated program defines the various diverse operations that may need to be done with the name and address fields. The variable, e.g., address data, is bound to the cell and contains the programming information that knows the rules for manipulating it, so that at higher level the data may be handled only by reference to the variable name without concern as to how to manage the underlying information. In this fashion, the overall system may be simplified leaving the complexity of processing to the individual objects.

By identifying an instance as a variable, complex data structures including programs, may be manipulated through an instance designator. An instance variable is a mechanism for referring to the entire object instance.

The stored cell is a stored file on disk. The stored cell is used to create an internal control block "cellBlock" as well as ancillary blocks which are used during execution by the operating system's interpreter/executor.

To better illustrate the manner of operation of the present invention, consider the task of writing a new income tax related object class in accordance with the methodology of the present invention. The object class program will include statements that call other already existing programs for accomplishing necessary tasks.

In this example, the "cell" created may be viewed as an electronic form designed to handle income taxes. The program for performing the income tax calculations and form generation may call existing income tax generating routines. Initially, the interpreter/executor (I/E) is directed to run the income tax class. Since the class is only a program—it is not a cell with existing data, the I/E compiles the class (unless it is already pre-compiled into a p-code form), and proceeds to create a new cell. The program is compiled and loaded into the main storage. The interpreter then builds a classBlock for the programs as will be described in detail below. The class may, for example, be defined in terms of generating a "Form 1040." A routine in the interpreter creates a cell block for this initial instance of a class, prepares it for execution, and performs the "Create" method of the "Form 1040" class.

During execution of methods in this class, other classes may be invoked and new instances generated if there is a need to create further related forms in addition to the Form 1040. The generation of an additional form may cause yet another program to be brought into main storage necessary to generate the related instance.

Due to the nature of income tax filings, there may be a variety of classes, each having various instances which need to be created. Each of such instances is automatically handled by the methodology of the present invention.

A function or "method" name may be treated differently by each of the related class instances. For example, consider a request to determine the net income tax owed. For each of the associated classes and instances, a different net income tax owed may be generated but only a single function request is necessary to gather such information. Each of the instances associated with a cell may compute the net income tax owed based on the methodology of which it is internally aware but which may be unknown to the higher-level D "Form 1040" main program class itself.

Each of these instances may have associated completely different variables, but yet, at a higher level, the program may use a single variable name, such as "net tax owed," to acquire all necessary information. All related programs which generate different forms are written into a cell upon the storage of the cell. The so-stored cell may then be readily electronically transmitted as a self-contained module to an accountant at a remote location.

The accountant, upon receiving the stored and transmitted cell runs it with the interpreter/executor. It then determines that this is a cell, rather than a class, which is being executed or a cell is being executed. Since the cell has been executed and transmitted already exists, the executor causes the existing cell to be loaded into the accountant's computer's main memory as an internal control block data structure identified as a "cell block." Other internal control blocks are also generated, as will be explained further below.

Upon execution in the accountant's computer, the form-generating program will be executed in a "restart" mode, as will be explained below. The routine executing in the accountant's system performs the processing necessary to display the appropriate tax forms for which the net tax owed was calculated.

Prior to describing the presently preferred data structures, we first turn to some definitions and concepts which will be helpful in understanding the following detailed description.

In the described embodiment, each object CLASS is defined as a separate source definition (e.g., a separate file in a computer directory). Optionally, it may be pre-compiled into a discrete p-code, which also remains as a discrete entity. It would be possible to include several classes within a single source or p-code definition; although is not the case with the present embodiment, it is contemplated in the future.

With either case, whether source or p-code, the CLASS definition may be digitally signed in order to insure integrity or define explicit program authorization. Depending on implementation, it may be sufficient for the CLASS to be digitally signed and verifiable by a particular public key or certificate, or to have a particular key or certification in the certification hierarchy. Alternatively, a more comprehensive scheme of authorization control could be employed such as described in inventor's Program Authorization application Ser. No. 07/883,868, which has been incorporated herein by reference.

The described implementation is based on the REXX programming language—which is IBM's System's Application Architecture (SAA) standard. In those aspects of the invention embodying a plurality of programming languages, the described implementation uses the standard "BASIC" language. As indicated above, the standard language(s) is/are extended with new programming constructs and new built-in functions to facilitate object-oriented programming according to this invention. Obviously, this decision could be reversed, and other, or additional languages could be used.

Some of the object oriented extensions include a new variety of data—object instance reference values. The REXX language defined only one variety of data: strings. These are subject to standard operations, including, e.g., assignment, concatenation, arithmetic. (Only strings reflecting numbers can be used in arithmetic operations).

In the described embodiment, instance values are treated as fundamentally different than strings, and they are disallowed as being treated as normal string values (such as arithmetical or string operands); however, they can appear, for example, in assignment statements, as arguments and as parameters. It is certainly possible that in an alternative implementation of this invention, that whenever an instance value appeared where a string value was expected, that this would result in implicit invocation of a special (or default) method to that instance to generate a string. Similarly, there are places where instance values appear and string values are generally disallowed—such as METHOD invocations.

At any given time, a variable can contain its default value (which, in REXX, is generally the string value of its name), a string value, or an instance value. A variable can be assigned different varieties of values at different times; this is entirely flexible and depends solely on a program's logic. At each use, only the current value of the variable is effective.

Variables assure instance value by assignment from "object" type built-in functions (such as "new," "reload," etc.), other variables with instance values, other functions that review instance values, as parameter values passed by a cabler, or, in the case of REXX, through the parse statement.

In the preferred implementation, program variables can belong to one of four different pools (conventional REXX and BASIC have no particular concept of such variable pools):

GLOBAL—defines variables associated with all instances in a particular cell. GLOBAL variables are accessible to any instance (within the cell) from any class which declares this variable GLOBAL. Each cell has its own global pool. In the present embodiment of the invention, instances within a (sub-)cell only have access to the global pool for that cell—not of the super-cell. Nor does an instance properly contained within one cell have access to the global pools of subcells. Other embodiments of the invention could operate differently.

SHARED—defines variables associated with a particular instance, but shared among all classes in the instance's lineage which declare this variable as SHARED. (Different instances each have their own distinct occurrence of this variable).

PRIVATE—associated with a particular instance. PRIVATE variables are accessible only to the instance and within the class definition in which it is declared (and not accessible to other classes in the instance's lineage). Even different classes within the same lineage would have distinct occurrences of this variable.

LOCAL—associated with a particular current execution of a particular instance. LOCAL variables are undefined at the start of each method execution and are discarded when the method is complete. If several instances of the same instance are concurrently active, then each has its own version of the local variables.

If a variable's pool is unspecified, then it is LOCAL.

Variables can be explicitly discarded at any time by being dropped (REXX style), or having their value reassigned. However, each variable is also discarded when the particular object entity with which it is associated is discarded.

LOCAL variables are discarded after each method execution. PRIVATE and SHARED variables are preserved across methods, but are discarded when the instance is deleted or destroyed. GLOBAL variables are discarded only when the cell is deleted.

Only GLOBAL variables are accessible by more than one instance. (Of course, values, including instances values, can be passed between instances as parameters and received as arguments).

New object-oriented statements have been added:

CLASS—to explicitly specify the name of the data class being defined by this program and other characteristics.

GLOBAL—specifies variables from the GLOBAL pool.

SHARED—specifies variables to be shared within this instance among all the classes in the inheritance hierarchy. A variable is SHARED only between classes in the same instance (hierarchy) which stipulate SHARED.

PRIVATE—specifies variables in the PRIVATE pool.

METHOD—specifies the beginning of a method and the characteristics of the method, including whether or not it is allowed to be entered for a given instance if other methods are already active for this instance.

In the preferred implementation, each object instance is a composite data structure associated with up to 2+N different permanent data pools (where N is the number of class definitions in the instance's class lineage): the GLOBAL pool (for this cell), the SHARED pool (for the instance), and the N PRIVATE pools (for each class in the inheritance lineage associated with the pool's class).

Further, when a particular method is active for an instance, there is the additional LOCAL pool associated with that execution. Note that the preferred embodiment permits the possibility that an instance may be subject to concurrent execution, even of the same method—in this case, there are unique LOCAL pools for each respective concurrence (however, the same PRIVATE, SHARED, and GLOBAL variables are used for all concurrences).

FIG. 2 is an exemplary representation of the "cell block" 11 data structure. The cell block 11 is the root of the cell as it is loaded in main memory 2 of FIG. 1 for execution. The cell block 11 includes a "next cell" field 12 which is a pointer to the next cell block which is invoked by the subject cell block 11. Such a pointer is used when, for example, a Form 1040 generating cell block 11 invokes another cell for generating a state income tax form which is to be appended to the Federal Form 1040 (and is automatically invoked when the 1040 cell is executed). The next cell field may be used to link various cells together. There need not, of course, be an entry in the next cell field.

The "global pool" field 14 is a field which identifies the beginning of the pool of global variables which, as defined above, are variables associated with all instances in a particular cell. For example, in the income tax form generation example, the name variable may be a global variable applicable to all instances. Marital status may also be a global variable.

Cell block 11 also includes a "cell identifier" field 16 which identifies the cell by name and may include a version number, if desired. The cell block 11 includes a cell "face instance" field 18. The face instance field includes, as indicated in FIG. 2, a pointer to the instance for handling outside requests to the cell. In the income tax example, if a query is made to the cell as to the net income tax owed, the face instance is responsible for responding to the request by providing the desired result. This may involve inducing other instances within the cell. The face instance includes the program and associated data for controlling and handling requests/queries to the cell in its entirety.

Cell block 11 also includes a pointers 19 to file and certificate tags and a class table pointer to classes for the cell (20) which identifies the programs associated with the cell. Additionally, cell block 11 includes a cell signature field 22, which is a pointer to the digital signature structure for the cell. This cell signature is the digital signature that was extracted when the cell was stored. After the cell block is loaded, digital signatures are verified. The storage of the cell signature in cell block 11 permits display of the digital signatures upon request so that it can be determined who signed the cell.

FIG. 3 is an exemplary representation of "class block" 23 internal control block data structure. A cell will typically have many classes or program portions associated therewith. For each program, there is a unique classBlock data structure 23 created.

In accordance with the presently preferred implementation, every class is associated with a single program. The first field in classBlock 23 is a class link field 25 which is a link to other class blocks in the cell. The next field is "parent class" field 24. This field is a pointer to the classBlock from which the class is extended. A fundamental class is a class dependent on no other class. However, other classes may extend functions of the fundamental class and use its fundamental features. By way of example, only, such a fundamental class may be a program which builds a display window rectangle. It functions to build a rectangle on a display screen having a particular height, width and color characteristics.

A second class may be built upon the rectangle class, e.g., a "button" class, which utilizes all features of the window class, but additionally includes a number of features or extensions. The button class "inherits" the features of the parent window rectangle class.

The number of levels field 26 defines the number of classes involved in the lineage. In the prior example, the number of classes would be 2, e.g., the "button" class and the window rectangle class. ClassBlock 23 also includes a class name field 28 which identifies the class and a class program field 30 which is a pointer to the program block of the associated program. The program block is a list of all the programs that are loaded.

The classBlock 23 also includes a "method table" field 32 which is a pointer to the table of valid methods or functions which are used by the class. Thus, the various operations or functions which are performable by the class in question is identified. Each entry in the method table for the class has the format identified in field 32 in FIG. 3.

When a program to be executed is compiled, it is broken down into p-code so that it can be executed more rapidly. The method entry table 32 provides an identification as to where the p-code starts for the particular method of the associated class program. Thus, when a particular instance is executing and requires one of the valid methods to be performed, the method may be accessed and executed efficiently at high speed.

As shown in FIG. 3, each method entry includes a mechanism for linking to other related methods in the table. This may be done in a variety of fashions, including, for example, the use of the B-tree. The table also includes a pointer to the classBlock associated with the definition of the method sought to be performed. For example, the class window rectangle may contain the definition of the method which is to be performed in the "button" class.

The method table also stores an offset defining the start of the p-code for the method in the associated class. Additional method table entries include the length of the method name and the name of the method field.

The class authorization field 34 is a pointer to the authenticated authorization structure which defines those operations which are permitted to be performed in accordance with the applicant's copending program authorization information application Ser. No. 07/863,552. The classBlock 23 also includes an indication of the lowest and highest levels of programs making processable instances.

Figure 4:
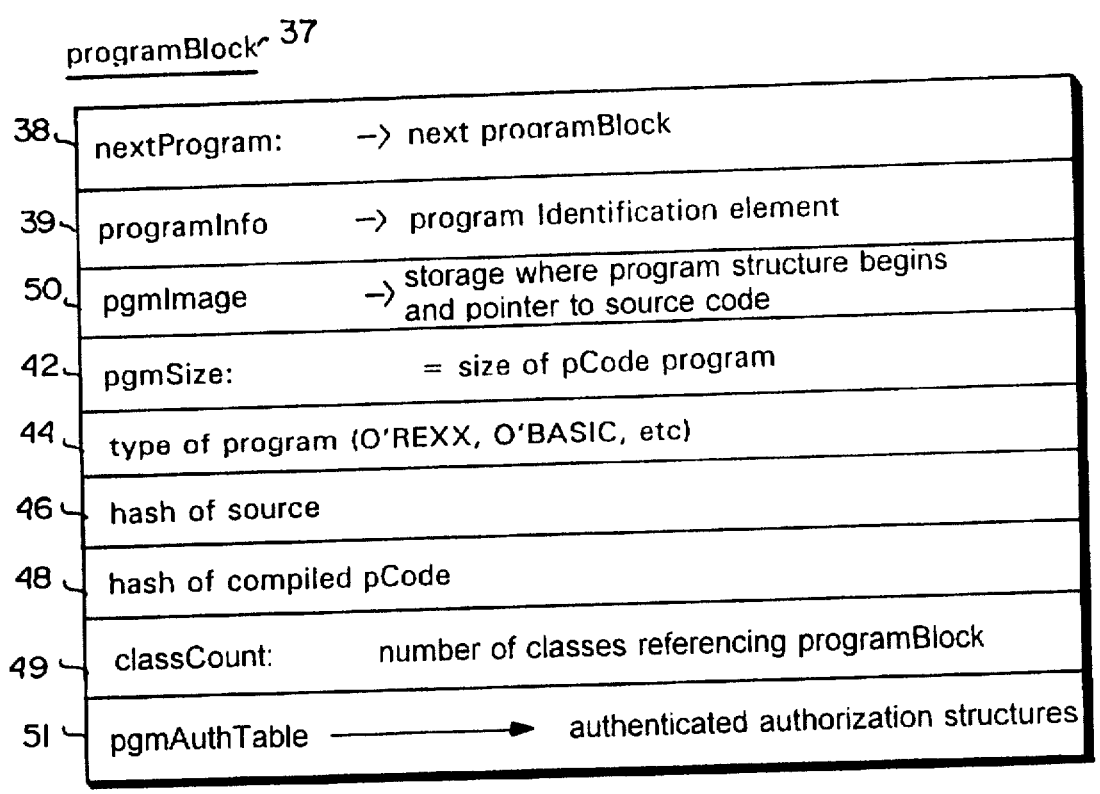
FIG. 4 is an exemplary "program block" data structure.

FIG. 4 is an exemplary data structure for the "program block" internal control block 37. The program block field identifies where the program is located at the time of its current execution, among other information. The program block data structure 37 includes a "next program" field 38, which is a pointer to the next program block invoked by the subject program. It provides a mechanism for linking related programs together. The program block data structure 37 also includes a program information field 39 which is a pointer to the program identification element. Field 42 defines the size of the p-code program which is stored in block 37. Also included in the program block is a "type of program" field 44 that identifies the program's language.

Fields 46 and 48 include the hashes of the source and compiled p-code versions of the program, respectively. These fields may be used to ensure that two programs having the same name can be distinguished. Additionally, the hashes may be used for verifying digital signatures for the program. The program block 37 also includes a class count field which identifies the number of classes referencing the program block, a program usage field 50 which is a pointer to the program structure control block and a pointer to the source code. Field 51 is a pointer to authenticated authorization structures which are structured in accordance with the applicant's Program Authorization Information application.

Figure 5:
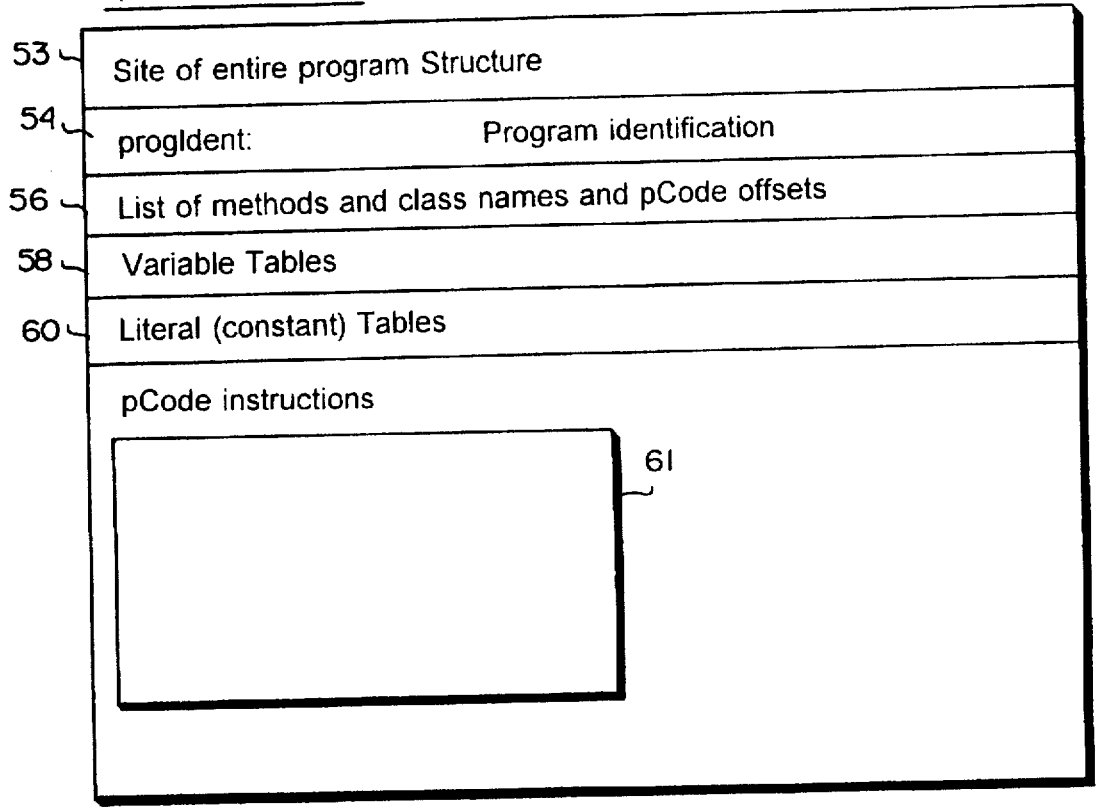
FIG. 5 is an exemplary "program structure" data structure.

FIG. 5 is an exemplary program structure" control block 52. Whereas the program control block 37 includes fields some of which may vary, the "program structure" fields are constant regardless of the platform which is executing the program, and is the form or the p-code if it is stored on disk.

"Program structure" control block 52 includes 53 which identifies the size of the program structure field 54 which is a "program identifier" and stores the name used to identify a particular program. The program structure block also includes a field 56 identifying the list of methods and class names associated with the program and the associated p-code offsets for identifying the start of the p-code for the associated method. The "program structure" block 52 also includes a "variable tables" field 58 and a table of constants field 60.

The program structure block 52 also includes, as shown in FIG. 5, the p-code instructions 61 of the program.

FIG. 6 is an exemplary "execution" internal control block 62. The execution control block 62 keeps track of the current state of the execution process. The execution control block 62 includes a next instruction field 64 which is a pointer to the next p-code instruction.

Execution control block 62 also includes a "class pointer" field 66 which points to the associated classBlock. An instance execution field 68 points to the particular instance being executed and a local pool field 70 points to the pool for local variables. Before the method starts, there will be no local variables. As the program executes, local variables are stored in a scratch pad type memory and the execution block points to where those local variables reside. The execution block 62 also includes a "previous execution block" field 72 which points to the previous execution block which was under control prior to the current execution block being processed.

There are likely to be additional fields in this block to accommodate details, such as those outlined in applicant's Travelling Program Application, conceived with other aspects of execution which are not necessarily unique to this invention (such as do blocks, procedures blocks, etc.)

FIG. 7 is an exemplary "instance value" data structure 73. An instance is particular data with a program bound thereto as an object. For example, an instance may be the data for a particular income tax form bound to a program which determines the net tax owed.

The "instance value" data structure 73 includes a "class reference" field 74, which points to a particular class program for handling the instance values in data structure 73. Data structure 73 also includes a "cell reference" field 76, which points to a particular cell block for the instance (in case more than one cell is involved). Instance value structure 73 also includes a pending delete field 78 which is used to delete an instance after it has been executed.

Instance value data structure 73 also includes an "execution count" field 80 which identifies the number of active execution blocks for this instance, a scan indicator field 81 identifying a particular "save" operation (see description of FIG. 10), and a use count field 82 which identifies the number of pointers to this block including variables and the face instance. If no pointers point to this control block, then it may be an indication that the data structure should be deleted.

The data structure 73 includes a "level count" field 84 that identifies the number of levels in the associated classBlock which indicates the levels of inherited features as previously described in conjunction with FIG. 3. Data structure 73 also includes a "shared pool" field 86 which points to the memory head of the shared variables. This mechanism allows data to be shared among the programs within a given instance's class lineage. Data structure 73 also includes a private pool field 88 having the format shown in FIG. 7. Private pool fields relate to private variables only associated with a particular class within an instance's lineage.

Figure 8A:
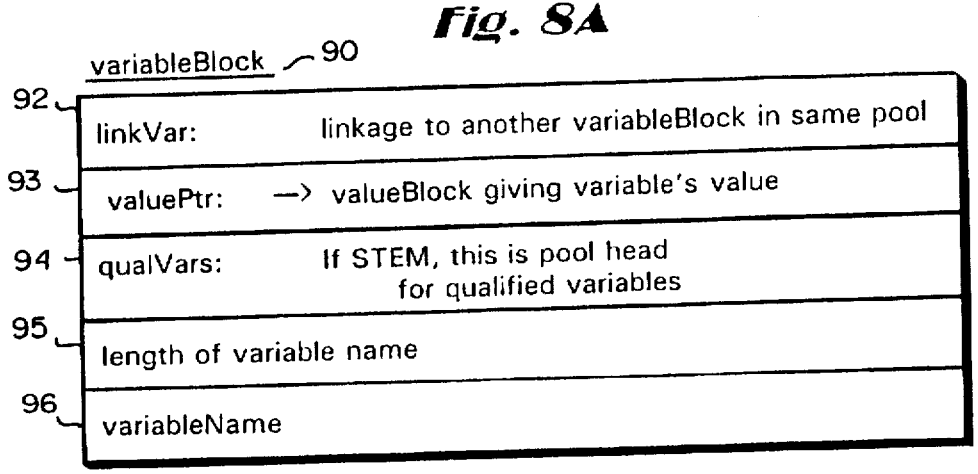
FIG. 8 is an exemplary "variable block" data structure.
FIG. 8B is an exemplary value Block" data structure.
Figure 8B:
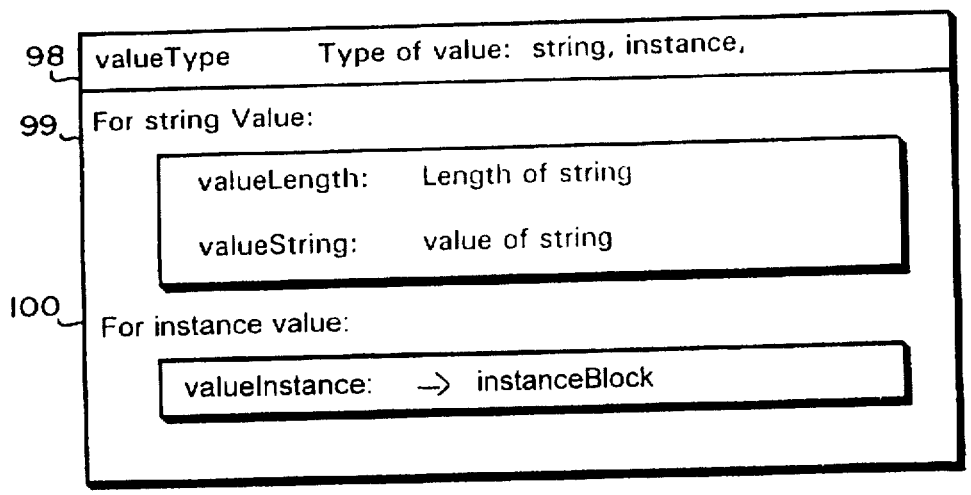

FIG. 8A is an exemplary "variable block" data structure 90. Variable block data structure 90 includes a "link variable" field 92 which is a linkage to another variable block in the same variable pool in the system. Field 93 is a pointer to a value block which gives the variable's value. Field 94 identifies a pool head for qualified variables. The length of the variable name and the variable name are specified in fields 95 and 96, respectively. FIG. 8B is an exemplary value block data structure 97 which identifies the value of the variable. The data structure 97 includes a value type field 98 which identifies the variable as a string or instance. The data structure includes entries for strings (99) and instances (100) as shown in FIG. 8B.

Figure 9:
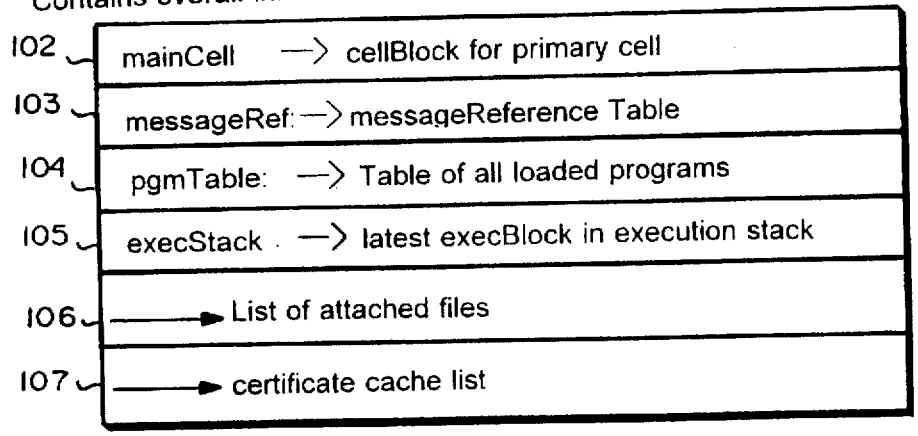
FIG. 9 is an exemplary master area block data structure.

FIG. 9 is an exemplary master area block data structure 101. The master area block contains overall system information and includes a number of pointers such as "maincell" 102 which points to the cell block for the primary cell, message reference 103 which points to the message reference table, program table 104 which points to the table of all loaded programs, "exec stack" 105 which points to the latest exec block in the execution stack, and pointers 106, 107 to the list of attached files and the certificate cache list.

Figure 10:
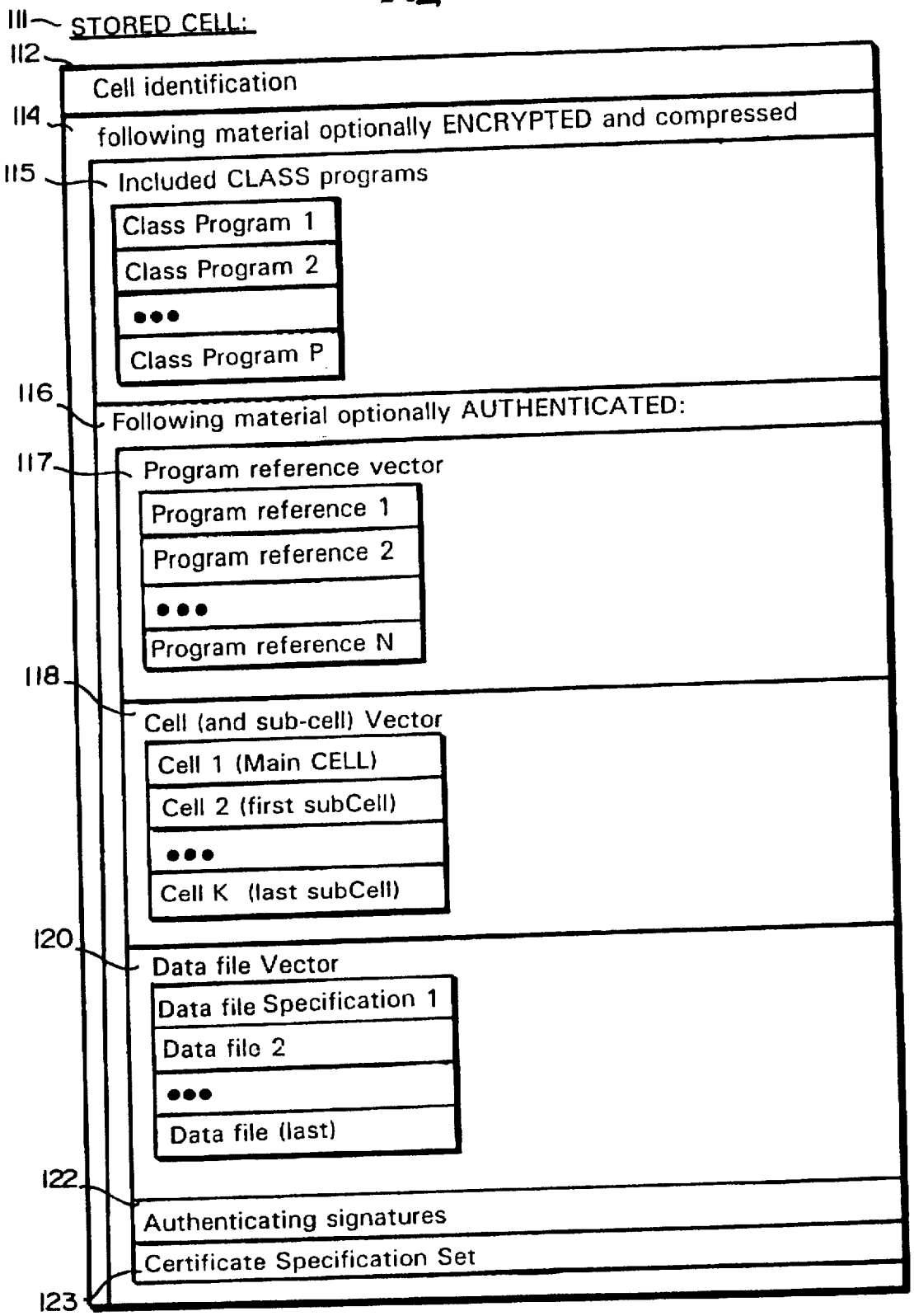
FIG. 10 is an exemplary "stored cell" as written to disk in accordance with an exemplary embodiment of the present invention.

FIG. 10 shows a "stored cell" 11 as written to disk in accordance with an exemplary embodiment of the present invention. The data format which is created and written to disk may be generated by a built-in function which is invoked from within a class program to save the current state of a cell (either the current cell or an associated cell).

Save can also be invoked from "outside" the cell, as an "environmental" function supplied to the user by the interpreter/executor—such as a "save" option on "pulldown" file action-bar field.

Storing a cell is done in at least two phases: the first phase is a "marking" phase in which is determined the set of all structural constituents that are to be stored. This includes the cells (subcells), variable pools, variables, values, instances, etc. In the present embodiment, neither local variables nor the current execution task structure (i.e., the active methods as represented by execBlocks) are saved as part of the cell. This is in accord with the strategy that, as part of restoration, the face cell is executed at its instance's "restart" method.

Programs using the "save" function must keep this special aspect in mind. The alternate approach, where the entire execution stack is saved in the cell, together with the transient (local) variables is also feasible and only requires slight addition of the current process: in which a structure representing the local stack (including the associated local transient variable pools) of all active methods is also saved in the cell. Such an approach is similar to that described in inventor's travelling-program invention application and has similar considerations.

During the first scan phase, the special "toBeSaved" methods are invoked (for those instances whose classes have them) in order to perform ancillary processing that may be needed to accommodate eventual smooth "restoration" operation. Such ancillary processing includes, for example: extracting current information which may not be immediately known to the cell from visual objects (such as perhaps, incomplete input field data). It is expected that most instances will have no special requirements since the state of most instances depends only on the values of internal persistent variables—which are automatically saved. It is incumbent on "toBeSaved" methods not to invoke or significantly alter the state of other active instances—since such instances may have already had their own "toBeSaved" methods driven.

After the "toBeSaved" method is driven for each instance, its variables (any in the private and shared pools, as well as any global variables which are referenced, or which belong to STEMs which are referenced) are examined and instances defined therein which have not been scanned are then so scheduled and marked with the serial number of the current save request, so that each instance will be scheduled precisely once. The scan starts with the face instance of the cell to be saved and proceeds recursively through all the (instance) variables which are then encountered.

Whatever instance is specified to the save function becomes the face instance of the resulting saved cell. If, in analyzing the related variables during the scan phase, it is determined that instances in other cells are referenced, then those cells are included as subcells in the new stored cell being created. It is possible in this way for the original main cell to become a subcell of one of its former subcells, and the former subcell to be the new main cell. This typically occurs when cells have inter-linking pointer variables.

The second scan phase then collects the aggregate set of variables and values which were marked in the first scan, and emits the stored cell (file) structure therefrom.

Depending on the options specified as part of the save request, all, some or none of the object class program definitions may be saved as part of the file. These are saved in either source or compiled form (or both), together with whatever authenticating or authorizing digital signature(s) structure(s) may have been encountered.

The saved data is separated into two portions: that which is essential to cell authentication, and that which is not. In this case, authentication is used to digitally sign the information necessary to assure accurate reconstruction of the cell when execution resumes after RESTORE. Information which is not essential, such as the image of class programs themselves is not signed, since such information is considered to be a "convenience" which can be added or omitted without impairing security. However, the identification of the various class programs, usually together with their hash is important, since it is used to insure that the correct classes are actually used. By allowing optional inclusion of the class programs in a cell, the cell can be stored in the most optimal way for its intended use.

The cell may also include additional data structures. In the described implementation, there are two such sets of additional information: certificates and external files—which are specifically incorporated and need to be bound to the cell.

The list of digital signature certificates is called the "common certificate cache." These certificates are associated digital signatures performed on at least three different classes of data structures:

class program definitions (for authentication and/or authorization).

data within instances which has been authenticated or authorized as part of program execution (for example, an ANSI X12 850 Purchase Order transaction set). These signatures are solicited by program logic itself on constructed data, and the certificates may be explicitly relegated to the common certificate cache.

the body of the cell which is authenticated during transmission.

Combining the certificates into the "common certificate cache" allows certificates to be carried within the cell without duplication. Duplication is likely to occur because, for example, different object program classes are often authorized by common trust agents; and many different data signatures may be signed by a single user, or by users close together in the certification hierarchy (and therefore having many common certificates).

By being located within the unauthenticated portion of the cell, certificates can be added or excised as the usage of the cell becomes evident. For example, a cell destined for short term local storage may not need to have embedded certificates, since this wastes storage with excessive duplication. However, it becomes reasonable to embed the certificates in the cell if it is moved to long-term archive, or if it is being transmitted to other users (who may not have all relevant certificates in their cache).

Maintaining a single cache of certificates for a stored cell requires that the various certificated elements maintain use counts. To this end, each (sub-)cell contains the summary of certificates it requires, which requires that data signature have its certificates presented for cache insertion when the signature is created or received, and for cache excision when the signature value is released or becomes useless. Similar use counts are kept for signatures belonging to class programs, and even the cell itself. Each certificate summary consists of little more than the hash of the certificate the use count(s).

Another category of embedded data includes "external" data files which have been attached to the cell. The motivation and mechanism for doing this are described in detail in the Travelling Program Application. However, with multiple cells, it is desirable to also maintain indicators as to which (sub-)cells are using the various files, in case some subcells are "broken out" and saved as their own separate stored-cell entity.

With respect to storing a cell, it is important to scan and mark everything to be stored, including the face instance value and the global pool. For pools, scan and mark all the variables in the pool. For variables, scan and mark all the values and sub-variables associated with the variable. Sub-variables occur within "REXX" as constituents of a stem variable.

With respect to values, indicate the value has been seen during this store process for string values. For instance values, indicate the value has been seen during this store and invoke the "toBeStored" method for the classes associated with this instance (use same multiple method approach with "priority" consideration as method approach with the "new" method for create as described elsewhere). Mark the class associated with this instance; scan and mark the shared pool and the private pool associated with each class in the instance's class lineage.

For classes, mark the class program definition, including any digitally signed (or otherwise imputed) authorization or authentication and scan and mark the class's base class(es), if any.

For storing items marked, in the case of classes, the hash of the source and/or p-code (as appropriate or specified in the current circumstance) is always stored. It is also possible that either the image of the source code or the p-code, or both, may be stored, but these are preferably stored in the portion of the cell which is not subject to overall authentication.

Also stored is the level of the interpreter/executor, and the level of the application version of each of the class programs. This allows the possibility of future substitution of an enhanced/corrected replacement class provided the replacement is functionally consistent with the data in the existing instance.

It is often desirable to also store any digital signatures, certification and/or authorization that may be associated with a class—and, depending on the options specified and the goal of the particular embodiment, it may be appropriate to store this in either the authenticated or the unauthenticated portion of the stored cell.

Also, in keeping with the inventor's above-identified Travelling Program Application which has been incorporated herein by reference, it may be desirable to also store copies of various other files as part of the stored cell.

As the final step in storing the cell, and if required by the implementation or the save options, then the critical "authenticated" portion of the cell is digitally signed.

To mail a travelling object-oriented program: mail an image of the stored cell (as would be created by "storing a cell." If it is known that (all) the recipient(s) possess a given class definition, then it need not be included in the stored (and mailed) image (this allows a smaller transmitted image); otherwise, the conservative course of action is to include the source code, the p-code, or both (including the source code allows a different version of the interpreter/executor to reinterpret the class—which is useful if different versions of the interpreter/executor have incompatible p-codes).

Turning back to FIG. 10, the stored cell 111 on disk includes a cell identification field 112 which identifies the cell. For example, the cell identification provides the name, e.g., Purchase Order for Corporation X, which permits a program to scan a file and pull up the file name to access the cell.

As indicated at 114 in FIG. 10, all the material which follows, may if desired be encrypted and stored in compressed form the specific programs associated with the cell are stored in in field 115 on disk (including, e.g., class program 1, 2, ... P).

As indicated at label 116 in FIG. 10, the material which follows in the stored cell may be optionally authenticated. Thus, once this material is stored in the cell, it cannot be altered without affecting the apparent integrity of the material.

Field 117 includes a set of "program reference vectors" from program reference 1 through program reference N. In this fashion, instead of storing the entire program on disk, an unambiguous reference to the program may alternatively be utilized such that the program may be later accessed as desired. The "program reference vector" 117 unambiguously identifies each cell program, such that if necessary it may be accessed from a program library.

Cell (and subcell) vector field 118 defines the main cell stored, as well as all sub-cells if more than one cell is associated with the file, where one main cell has absorbed other subcells. The "data file vector" field 120 includes data file specifications for various files which may be carried with the program when used in travelling program applications in accordance with above-identified travelling program methodology.

The "authenticating signature" field 122 is used to store signatures associated with the signature authenticated material defining the program cell, if it is desired to be authenticated. Finally, field 123 stores a certificate specification set for maintaining any certificates used in digital signature processes.

Figure 11A:
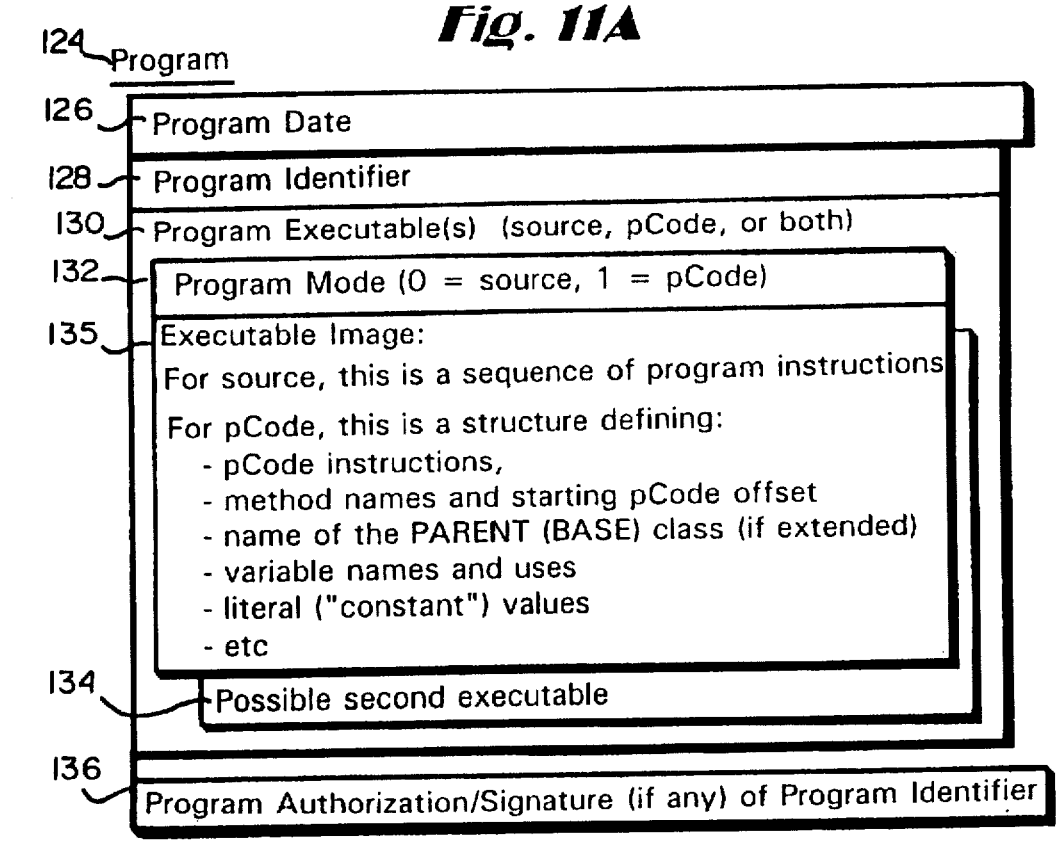
Figure 11B:
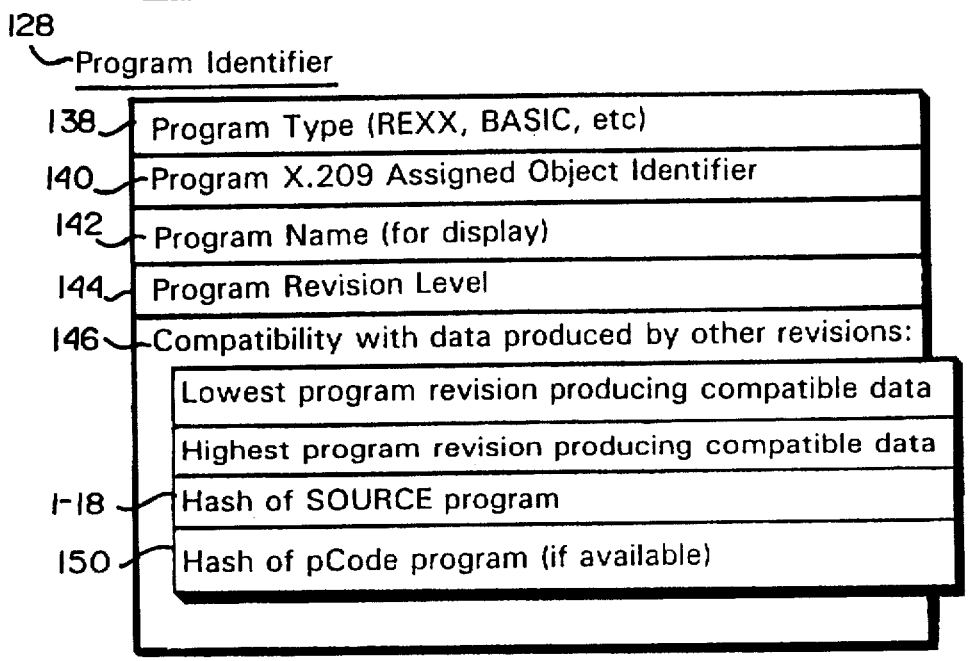
Figure 11C:
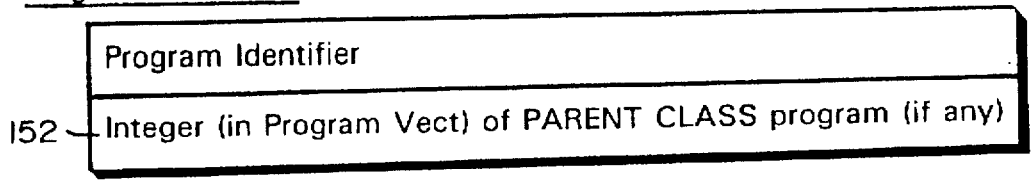

FIGS. 11A through 11K are expanded data structures showing stored cell portions in further detail. Program data structure 124 shown in FIG. 11A is an exploded view of the class program 1-P fields shown in FIG. 10. The first field in the program data structure 124 is the "program date" field 126, which may define the date the program was made or compiled.

The program identifier field 128 is the name associated with the program. The "program identifier" 128 is expanded in FIG. 11B and will be described further below.

The "program executable" field 130 specifies whether the program is executable in source code, p-code or both and uses program mode field 132 to specify whether the program may be executed in source code or p-code.

The program itself is resident in the executable image field 135 shown in FIG. 11A in source or p-code. The program structure is in the format as specified in FIG. 5, described above. In field 134, a possible second executable image of the program is stored if both source and p-code have been specified. Program authorization information and a digital signature of program identifier is stored in field 136. As mentioned previously, the program authorization information is utilized in accordance with the applicant's copending program authorization information patent application, which has been incorporated herein by reference.

The program identifier structure 128 identifies the programming type (field 138) by identifying the programming language.

Field 140 identifies a program X.209 assigned object identifier, which is an identifier in accordance with the X.209 protocol which uniquely identifies the program in accordance with accepted standards. A program name field 142 identifies the specific program by name for display to the user.

Program Revision level field 144 identifies the program's revision level. Compatibility field 146 identifies the extent to which the program is compatible with data produced by other revisions from the lowest program revision producing compatible data to the highest program revision producing compatible data. Typically, one imagines the highest revision level will equal that of the current revision. However, if it is anticipated that the current private, shared and global variables will be "upward" compatible with future releases, then planned future revision levels can be set aside. The program identifier structure 128 also includes a hash of the source program field 148 and hash of the p-code program field 150.

The "program reference" structure 151 is a blow up of the program reference information shown in FIG. 10 and includes the program identifier field 128, described above in FIG. 11B. Additionally, the "integer field" 152 of the parent class program identifies the version of the parent class program which is referenced as compatible in embodiments where more than one class is allowed per program, then this field must be moved to a new structure defined for each class.

Figure 11D:
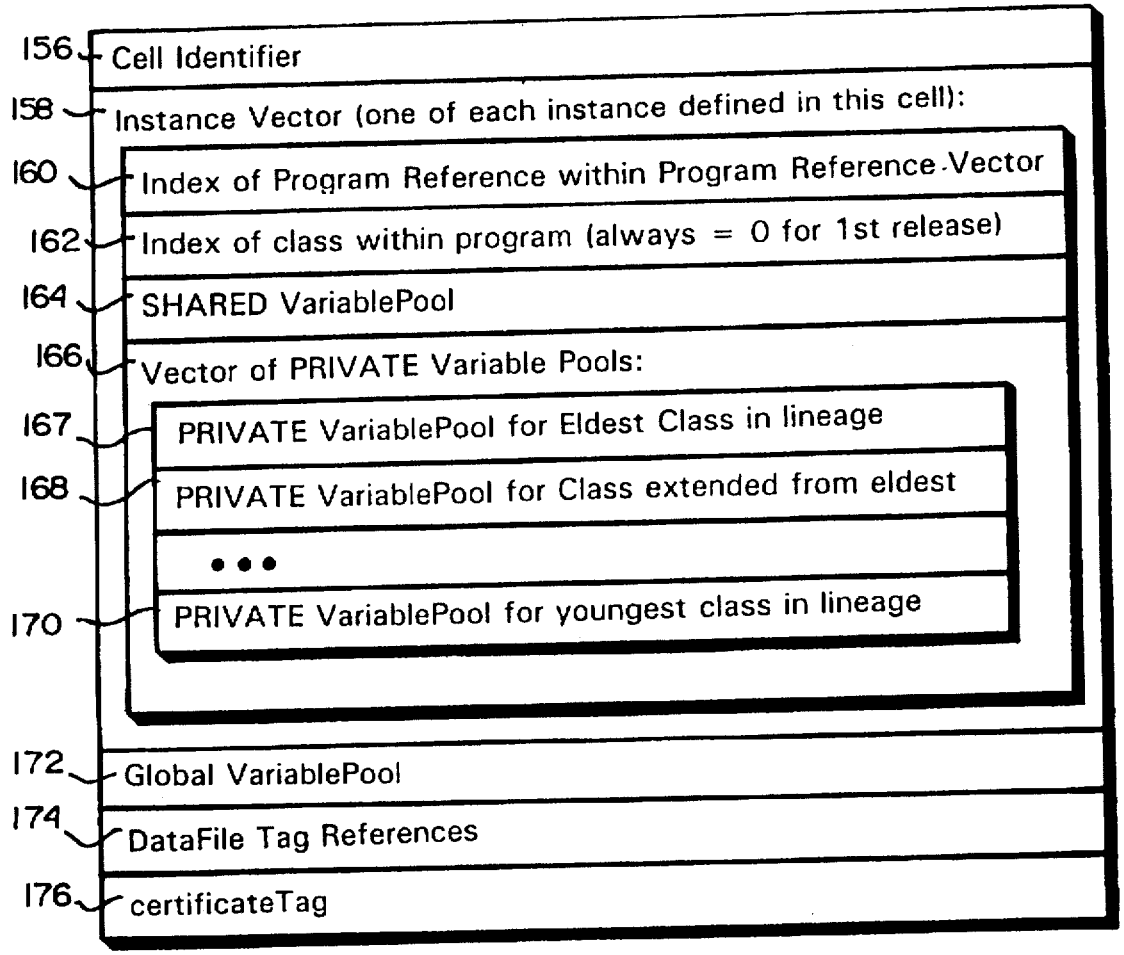

FIG. 11D is an exemplary cell data structure 118 expanding the corresponding cell of presentation in FIG. 10. Cell identifier 156 identifies the cell and is described further below in conjunction with FIG. 11G which shows an exploded version of the cell identifier.

The "instance vector" field 158 has one entry for each instance associated with the cell. The first entry is taken to be the face instance for this cell. Field 160 defines the index (within the Program Reference Vector) defining the program containing the class associated with this instance. Field 162 identifies which class within the program (identified in 160). In the current embodiment with only one class per program, this field is superfluous and always indicates the first class.

Instance field 164 defines the shared variables within the instance. Field 166 is the vector of private variable pools associated with class in the instance's lineage. Field 167 defines the private pool for the fundamental (eldest) class; while field 170 defines the private pool for the most extended (youngest) class in the instance's lineage.

Cell data structure 118 additionally includes a global variable pool field 172. Additionally, the cell 118 includes a data file tag reference field 174 which relates to the attaching of data files when the present invention is used in a travelling program context in accordance with the travelling program related application identified above. This data file tag field 174 keeps track of which cell has an associated attached data file. Certificates field 176 references the certificates which are referenced with the particular (sub-)cell 118.

Figure 11E:
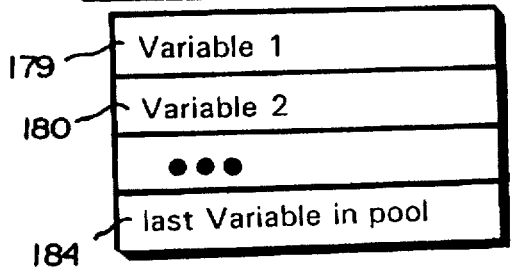

FIG. 11E is a generic representation of the variable pool data structure 178 which includes variables 1, 2, to the last variable in the pool (fields 179 through 181). The structure may be utilized in conjunction with either a shared variable pool, a private variable pool, or a global variable pool.

The variables structure 182 is identified as shown in FIG. 11F. The variable data structure 182 includes the variable name 183 to identify the variable and includes a variable value field 184. In accordance with the present invention, variables may have strings or instances as values. The variable value field is represented in X.209 representation within the stored cell. The X.209 data type used to define the type of the value: if the stored value is an X.209 OCTET type, then this is a string value and directly represents the variable's value. If the stored value is an X.209 integer type, then this is taken to represent the instance indexed in the cell's instance vector (field 158) by the integer value. If the stored value is an X.209 sequence type, this is taken to be an instance in a different (sub)cell, wherein the first integer in the sequence defines the instance in the 158 instance vector associated with the cell indexed in the cell vector 118 using the second integer of the sequence. If the variable is a simple variable (not a stem) or a stem with no qualified variables, and the variable has no assigned value, then it is omitted from the pool. However, if it is a stem with qualifications but no assigned value, then it is included, however, the stored value is represented as an X.209 null primitive.

FIG. 11G shows an exploded view of cell identifier 156 of the cell data structure shown in FIG. 11D. The cell identifier 156 includes a cell format code field 186 which is used to distinguish old formats from current formats. The "moment of construction" field 187 defines the time the cell was built.

Field 188 is used to identify the cell category using an X.209 object identifier and may, for example, be used to identify the cell category as relating to income tax form generation. The cell category is designated by name in field 189. Cell instance identifier field 190 may be used to further identify the instance with respect to the individual cell, e.g., to generate the net tax owed for a particular individual. The fields 190 through 196 provide further cell identifying details with respect to identifying the instance's name, title and various qualifiers as needed for a particular application.

Figure 11H:
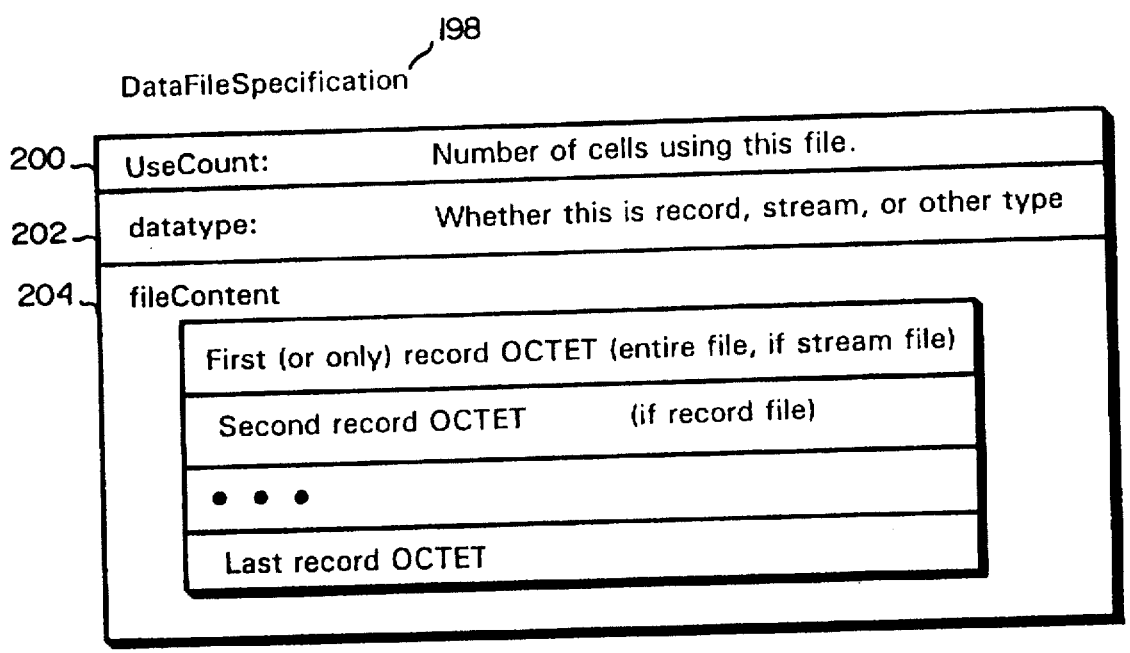

FIG. 11H is an exemplary data file specification data structure 198. This data file specification data structure 198 is useful particularly in a travelling-program context in accordance with the methodology of the inventor's above-identified copending travelling program related application in which data files are, for example, attached to a travelling program. Use count field 200 identifies the number of cells which use the identified data file. Data type field 202 identifies the nature of the data contained in the file so as to denote whether the file is a record, bitstream, or other type of file. File content field 204 is used to describe with more specificity the nature of the file and its constituent records.

Figure 11I:
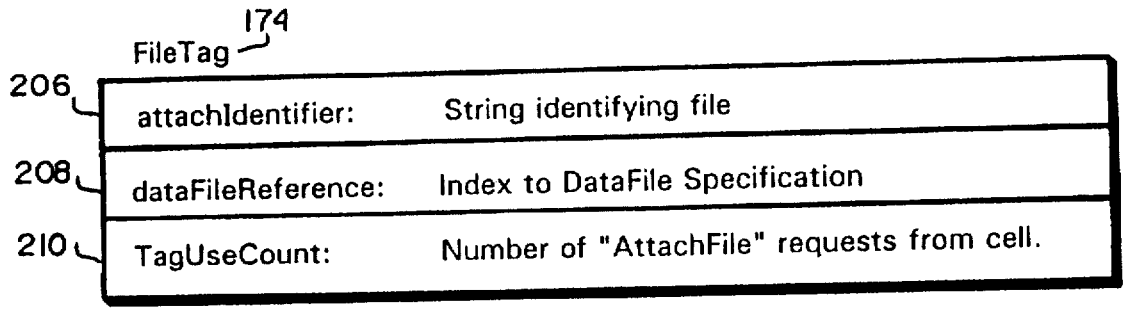

FIG. 11I shows an exemplary file tag data structure 174 and is an exploded view of field 174 in FIG. 11D. The "attach identifier" field 206 is a data string that identifies the file which has been attached in accordance with the travelling program methodology described in the applicant's copending application. The data file reference field 208 is an index to the data file specification data structure 198 shown in FIG. 11H. The "tag use count" field 210 defines the number of attached file requests that have emanated from the subject cell.

Figure 11J:
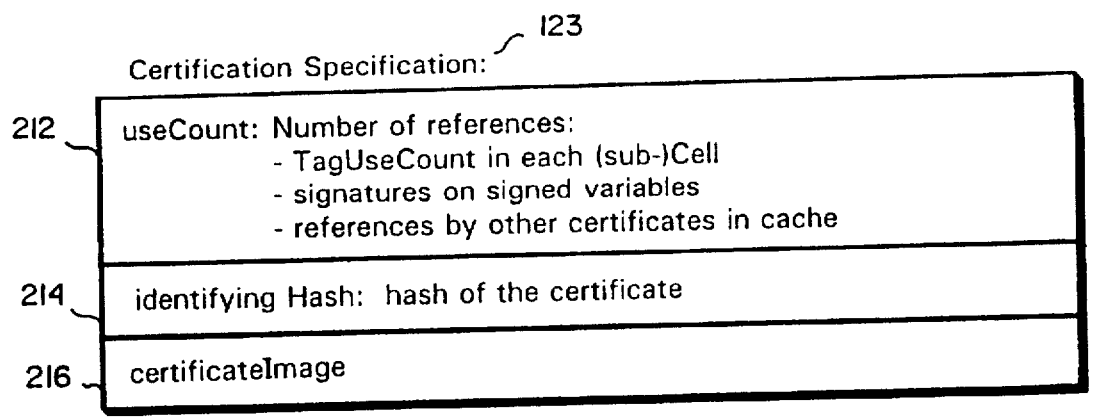

FIG. 11J is an exemplary certificate specification data structure 123 which is an exploded view of the "certificate specification" field of FIG. 10. The certificate specification data structure 123 includes a copy of each certificate used for digital signature operations for use in various digital signature contexts. One use of digital certificates in the present system is to sign individual programs to give those programs authority to perform various transactions. Such digital signatures may be performed in accordance with the applicant's enhanced digital signature methodology as described in U.S. Pat. Nos. 5,005,200; 4,868,877; and 5,001,752. Another use for digital signatures and associated certificates is to have the program sign data with which it is associated as per Travelling Program Patent application. A digital certificate is also useful in operations involving signing the overall cell, particularly where the overall cell will be transported from one user to another via the applicant's travelling program methodology.

The use count field 212 specifies the number of references to the certificate. The use count field may also include the tag use count in each cell or subcell, the signatures on signed variables and the references by other certificates in the certificate specification cache. All certificates used in the cell may be stored in this common certificate cache memory. An "identifying hash" certificate field 214 and the certificate itself in field 216.

Figure 11K:
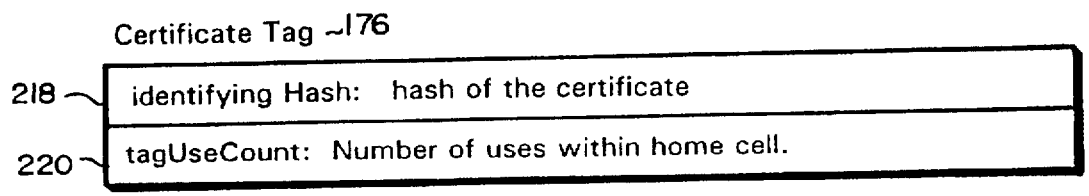

An exemplary "certificate tag" data structure 176 is shown in FIG. 11K. The structure is used where cells are embedded in other cells to keep track of the certificate usage in such embedded cells. The certificate tag data structure includes an "identifying hash of the certificate" field 218 and a "tag use count" field 220 to identify the number of uses within the subject cell.

The preferred embodiment of the invention accepts either the REXX (or BASIC, alternatively) source as the definition of an object class, or as compiled p-code. Whenever a previously unseen object class is encountered, its source code is compiled (dynamically) into p-code within the computer memory.

Figure 12:
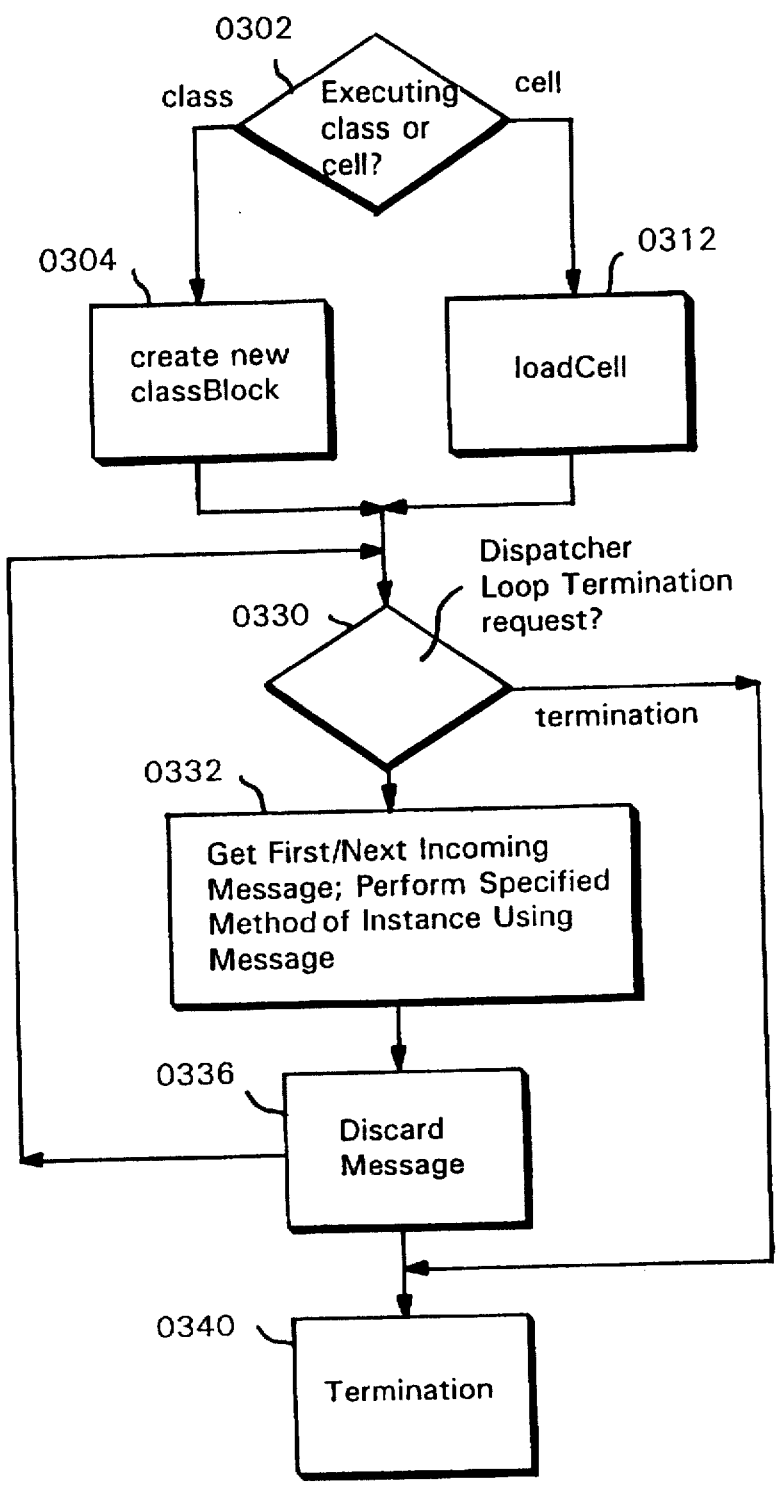
FIG. 12 is a general flowchart depicting the sequence of operations performed by the interpreter/executor.

FIG. 12 is a general flowchart depicting the sequence of operations performed by the interpreter/executor. Initially, the interpreter/executor is loaded by the underlying computer operating system. It creates a master control area as shown in FIG. 9. Either as part of invocation or immediately thereafter, the interpreter determines whether initial execution is directed toward a class definition or an existing cell. This knowledge may be embodied in the execution request or may be solicited from the user. For example, it could be an explicit parameter or it could be determined from the initial file name.

If a class is to be executed, then this implies that a new cell is being created. The interpreter creates a control block for the active cell and loads the class lineage hierarchy (as described in more detail later). The instance for this class is created. This instance becomes the "face" class for the cell. The "create" method is then invoked for this instance.

If an existing cell is to be executed, then this cell is "reloaded" (as described elsewhere), so that all constituent variables, values, program classes, and embedded sub-instances, etc., are reconstituted into executable state. Then the face instance is invoked using the "restart" method.

In the preferred embodiment, it is incumbent on the face instance, whether by the "new" or "refresh" to interface with the environment (such as "Windows") so that further activity will be recognized. Such interfacing is done by invoking various functions and routines (such as may be built-into the interpreter or linked dynamically) to establish and prepare for interaction with the "environment"—e.g., displayed graphical objects, timers, other cells, other programs, databases, etc.

One of the chores of such interface function in the interpreter/executor, whether initially or during the natural progression of execution, is to maintain a table of external identifiers, so that incoming messages generated to the interpreter from external entities are properly matched to internal instances and methods. This table is maintained by functions driven by various classes.

In some cases, the initial method execution associated with the new or reload request ("create" or "restart," respectively) may be a signal that this is all that is needed—that there is no need for further additional processing. If this is the case, then the interpreter will have been so notified (that no further environment interaction is expected) and will undertake termination processing through the use of special "built-in" functions.

Otherwise, in the normal case, operation is driven through receipt by the interpreter/executor of messages generated by the environment (such as Windows), timers, devices, or other programs—including other cells.

When a message is received or encountered by the executor, it is matched to a table that associates instances and methods with incoming message identifiers. The instance is then activated using the indicated method. When the associated instance returns from the invoked method, the executor repeats its wait for a further message. This loop continues until the cell indicates that it is complete and should be terminated. Such indication is made with a termination built-in function.

Turning specifically to FIG. 12, when the interpreter/executor begins execution, initially it must be determined whether the system is executing a class or a cell (302). Upon initial execution, a program (class) may be executing to create a cell and its data or the system may be dealing with an existing cell already having its programs and data packaged together as described above.

If the check at block 302 reveals that a cell is being executed, then the routine branches to block 312 in which a "loadCell" function is called based upon a specified cell name. The load cell routine operates to verify the digital signatures, if any, that have been applied to the cell. In most cases, the signatures are used to indicate that the cell has not been tampered with since it was stored. When the cell is stored again, it will be different and the current signature will be moot.

It is noted that within a cell, digital signatures can also be performed on various data elements, or structures, to insure their unchanging integrity across an unlimited number of cell executions but their further verification is a matter controlled by the class programs. In the loadCell built-in function, the signature data is verified for class definition programs operating in connection with various instances. In the loadCell routine, a new cell block is created to maintain all new pointers. A call is made to the reload class routine to be described below for all classes. Classes are stored in lineage order so that every extension class follows its associated base. Thereafter, a restore pool routine is executed for global variables and a restore instance routine for the face and other instances. The pointer to the face instance is stored in the cell block as previously described. Once the instances are established, all variations that reference instances are updated with the final pointers.

Thereafter, the loadCell routine operates to drive the restart method for all instances which have this method. The routine only drives the restart once for each instance. This is controlled with flags in each instance block. Initially, the routine starts with the face instance. Instances can drive the restart method in other presumably related instances. For instances with restart methods which are not driven explicitly by other instances restart will be automatically driven after any explicit invocations. This is controlled by a flag within the instance's specification. For each instance, the order in which possibly multiple restart requests are driven is handled with the priority operand on the class field just as it is for the "createNew" routine to be described below.

In the loadCell block 312, a current cell is loaded. The cell which has been loaded in block 312 is saved as the primary cell. In block 304, a new cell block is created as the main or primary cell. The new instance is saved as the face instance to the primary cell. The manner in which a new instance is created will be described further below.

Whether a new cell has been created in block 304 or an existing cell has been loaded, as the routine enters block 330, a cell has been loaded into storage. The loop labeled "dispatcher loop" denotes the actual running of the programs associated with the cell.

In block 330, a check is made to determine whether termination has been requested. If termination has been requested, then the routine branches to block 340, in which termination operations, including performing a discard method of the face instance of the main cell to delete an operation, which deletes the cell block structure and the executor is exited.

If the check in block 330 reveals that there has not been a termination, then processing continues at block 332, where the first incoming message is retrieved. On subsequent passes through this loop, the next incoming message is retrieved. A "message reference table" is accessed to determine which instance is to be associated with the incoming message. If no associated instance is found, then the message is discarded, and a possible diagnostic message is issued and the routine branches back to the beginning of the dispatcher loop at block 330.

Presuming that the reference table specifies an instance, that instance is then invoked. The specified method of the instance is then performed using the incoming message fields as a parameter. The manner in which the method is performed is described below in further detail in conjunction with FIG. 13. After the method is performed in accordance with FIG. 13, the message is then discarded (336) and the routine branches back to block 330 to reenter the dispatcher loop.

Figure 13:
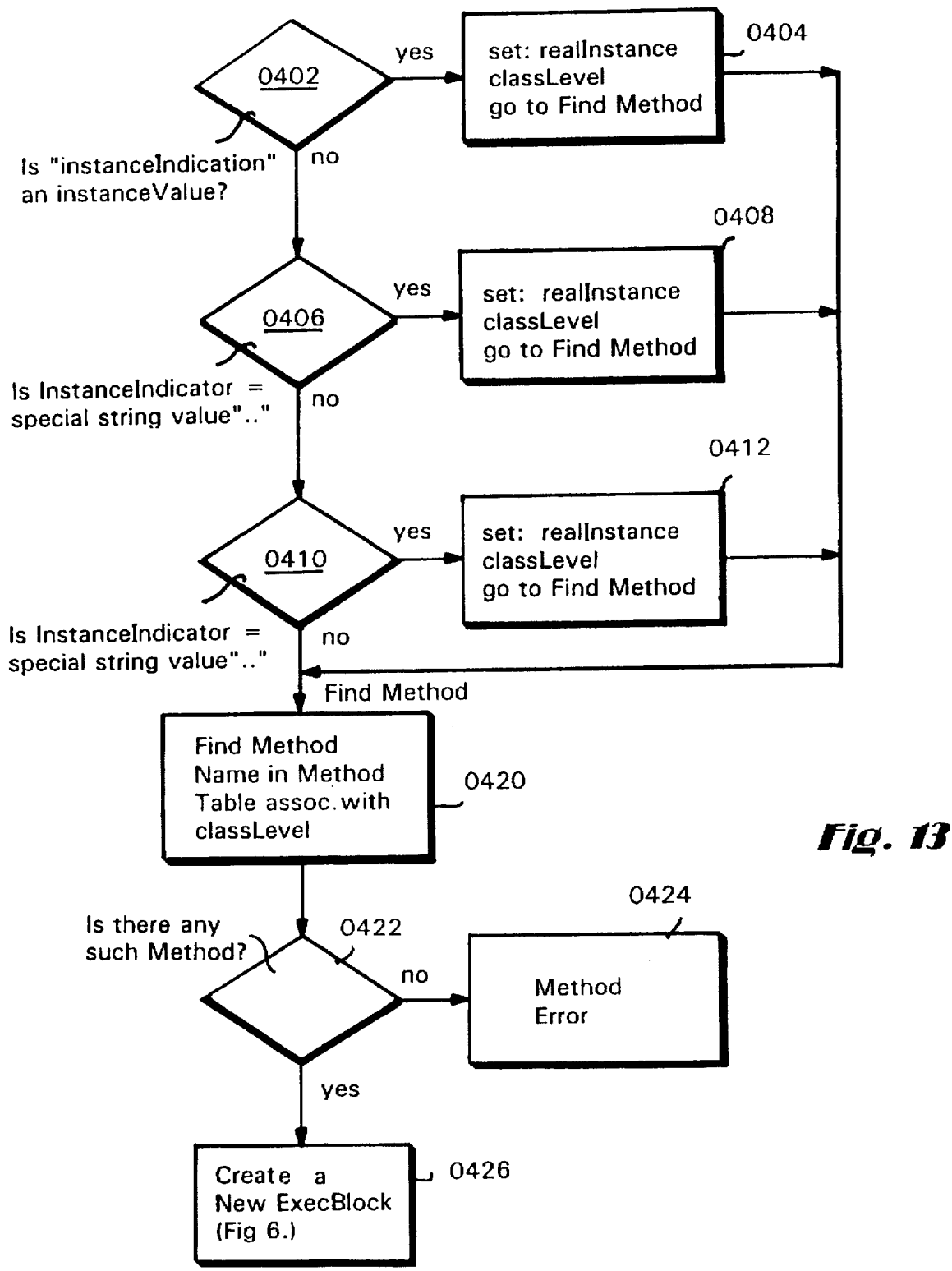
FIG. 13 is a flowchart delineating the sequence of operations performed by the perform method routine referred to in conjunction with the flowchart FIG. 12.

FIG. 13 is a flowchart delineating the sequence of operations performed by the "perform method" routine referred to in conjunction with the flowchart FIG. 12. The "perform method" flowchart is repeatedly executed. The routine takes a particular instance, which is treated in this system as a variable supplied as "instance indicator", and performs a particular method with it using supplied input parameters. In effect, the perform method routine operates as a variably named subroutine.

In accordance with block 402, if the "instance indicator" is an instance value, then that operation on the "instance value" data is performed using the identified method based on identified parameters (404). In block 404, the real instance is set to equal the instance indicator and the class level is set to equal the youngest (highest) class level associated with the instance's class. Thereafter, the routine branches to the "find method" portion of the routine at block 420.

If the instance indicator is not an instance value then a check is made at block 406 to see if the instance indicator is a special string value ".". The "." special string value indicates that the currently executing instance is performed with the input parameters. If the instance indicator does equal the special string value "." then the real instance variable is set equal to the currently executing instance and the class level is set to equal the class level in the currently executing instance as derived from the execution block shown in FIG. 6. The routine then branches to the find method processing beginning at block 420.

If the instance indicator check in block 406 is negative, then a check is made in block 410 to see if the instance indicator is equal to the special string value "..". If so, then, the real instance variable is set to equal the currently executing instance, and the class level is set to equal the class level of the parent class for the currently executing instance (i.e., corresponding to the base class of the currently executing class level; which equals the current class level from the current execution block minus 1, i.e., the parent class). In this fashion, a method belonging to the parent class may be performed even if the current class has a method of the same name.

In block 420, the method name associated with the class level that has been identified which is resident in the classBlock field 32, described above in conjunction with FIG. 3. A check is then made in block 422 as to whether there is such a method in the method table. If there is no such method, then the routine branches to block 424, which generates a method error indication.

If there is such a method, then a new execution block is created (426) as shown in FIG. 6. At this point in the routine process, the actual instance, the actual class level and the program to be used are known. The private and shared variables are then available and the exec block in FIG. 6 is built. Accordingly, as a result of this processing, the real instance is set as the instance value, the instance exec count is incremented, the current method and the actual class level associated with the current method is indicated. The method performed will be associated with an earlier class level than that indicated when the method is inherited from a base class.

The routine then prepares to process by setting the current p-code address as the first p-code instruction of the new method. The new execution level is placed at the top of the execution stack, and the routine branches to the executor/interpreter to execute instructions.

Instructions are executed under control of the current (highest) execBlock on the execution stack. P-code instructions are executed in a manner which will be understood by those skilled in the art. Reference may be made to the applicant's copending travelling program related application Ser. No. 07/863,552 which explains in conjunction with FIGS. 14 and 15 p-code execution related operations.

In executing a p-code operation, all variables associated with the p-code operation are determined, whether the variable is a literal or a local private, shared or global type, its value is located from the appropriate pool or if absent, a default action is taken to create the variable in the correct pool. Once the variable locator is found, the current value is isolated for use in the p-code operation.

In the preferred implementation, value assignments and disassignment are done using pointers and use counters. All values are extracted (and their use counts incremented) and tabularized prior to preparing any variables for p-code processing. The appropriate p-code executor routine is invoked, using the values which have been extracted from the literals and variables. The validity of the values is checked. For example, non-numeric strings are invalid in arithmetic operations. Similarly, there are different contexts in which instance values and string values are not respectively allowed.

In executing instructions, the next p-code instruction is selected as indicated by the current execBlock. The values are extracted based on variables and literals indicated in the p-code instruction. The routine specifically associated with the p-code instruction is then invoked. The following operations associated with executing p-code will be described in further detail: creating a new instance from class, loading an existing cell as an object, storing/mailing a specified instance as a cell, invoking a method associated with an instance, terminating the cell, providing security for any sensitive function and exiting a method. After a p-code instruction is executed, the routine accesses the next instruction as indicated by the execBlock.

As each method is executed, a mixture of variables: global, shared, private and local are all used. As a part of each instruction, as the values of the various operands are gathered, the interpreter/executor determines to which type of pool the variable is assigned. For local variables, the pool is defined in conjunction with the execution block. For private variables, each instanceBlock contains a vector of pool elements, with one element for each class in the class lineage. When a private variable is encountered, this vector is indexed by the method's class level (as stored in the method block when the method began) to access the variable pool containing the desired variable.

For shared variables, each instanceBlock contains the pool head for all variables which are to be shared among the various classes defined in the overall lineage. For global variables, the head of the global pool is stored in the cell with which the instance is associated. Once the pool is known, then the variable itself can be located using conventional means, such as a b-tree or hash look-up on the name. Literal values can be handled in a variety of ways. One way is to treat them as variables associated with the program class definition itself.

Figure 14:
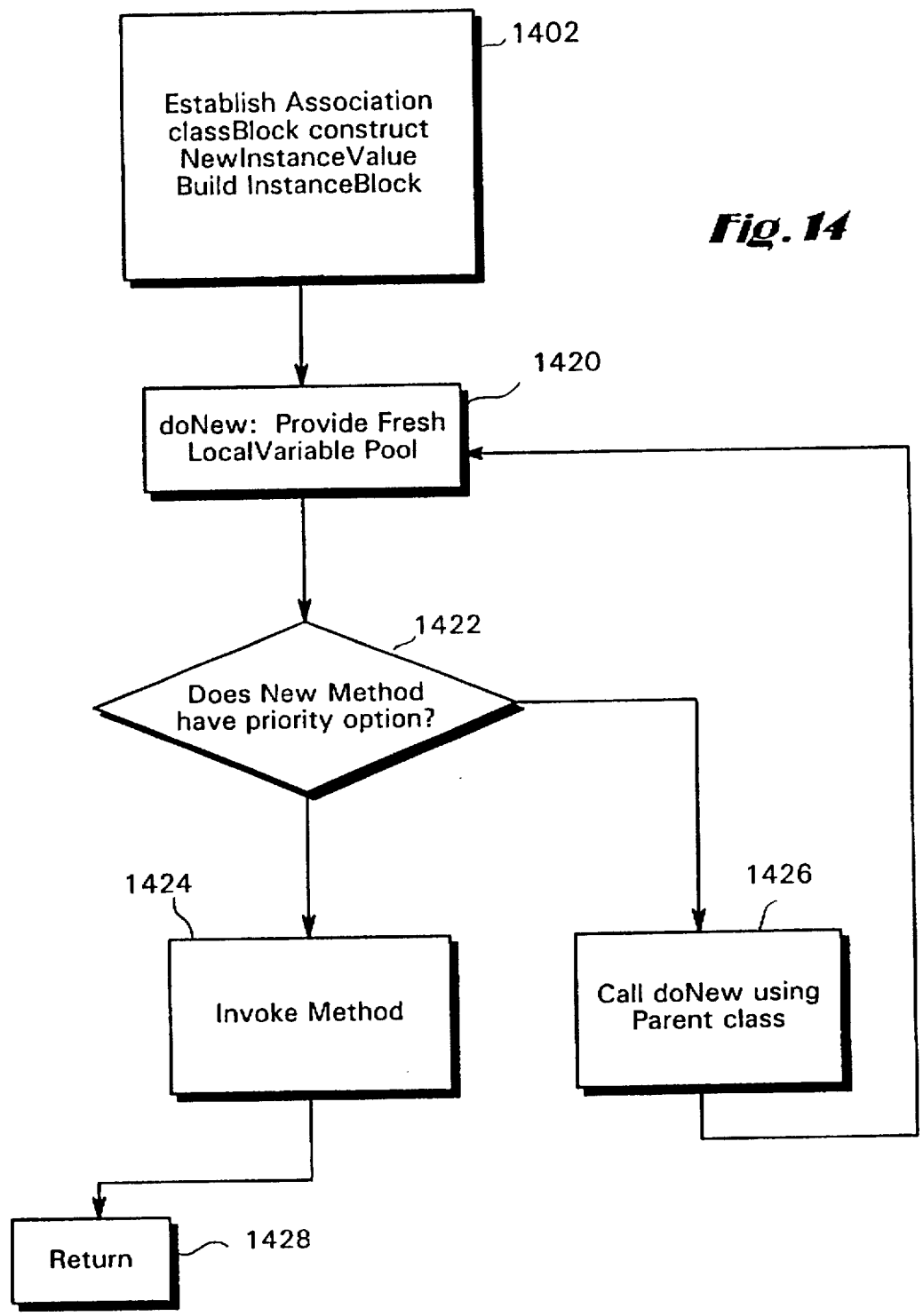
FIG. 14 is a flowchart delineating a sequence of operations in the create new instance subroutine.

FIG. 14 is a flowchart delineating the sequence of operations in the create new instance subroutine. The "create new instance" routine depicts how a new instance is initialized. Initially in block 1402, a load class routine is used to establish an associated classBlock, such as shown in FIG. 3. In block 1402, a new instance value is constructed and pertinent information is placed in the instance block such as the vector of heads for the private persistent variable pools associated with each class level. The first element of the vector is the head for the variable pool for the most senior class in the lineage, up through the last element in the vector which controls the private variables for the youngest class in the lineage. The information loaded in the instance block further includes the head of the shared persistent variable pool, the pointer to the associated classBlock, and the pointer to the associated cell block. The address of the new instance value is provided in block 1402. Thereafter, the doNew routine which begins at block 1420 is initiated, starting with the youngest class in the inheritance hierarchy.

For a given instance, the classes with "create" methods are driven in order to establish the initialization for the classes in the lineage.

When a new instance is created, it is generally necessary to make sure that the fundamental instance on which the new instance builds begin first and is automatically initialized. Thus, new instances are built, it is significant to build the oldest instance first and work toward the youngest. There are, however, exceptions to this general rule. The priority option in the "create" method routine provides the ability to select either option. In block 1420, a fresh local variable pool is provided as each class level runs.

A check is made in block 1422 to determine if the create method for the specified class has a priority option or the specified class has no parent base specified. If the new method for the specified class has a priority option or if the specified class has no parent, then the routine branches to block 1424, and the "create" method is invoked. Thereafter, the routine branches to block 1428 to return to caller. This "create" method must explicitly invoke its parent's classes create methods, if this is deemed appropriate. If block 1426 detect that the check in block 1422 indicates that the create method does not have "priority" option, then the routine reversing re-invokes block 1420 using the parental class The instance is marked indicating that create has been invoked.

Figure 15A:
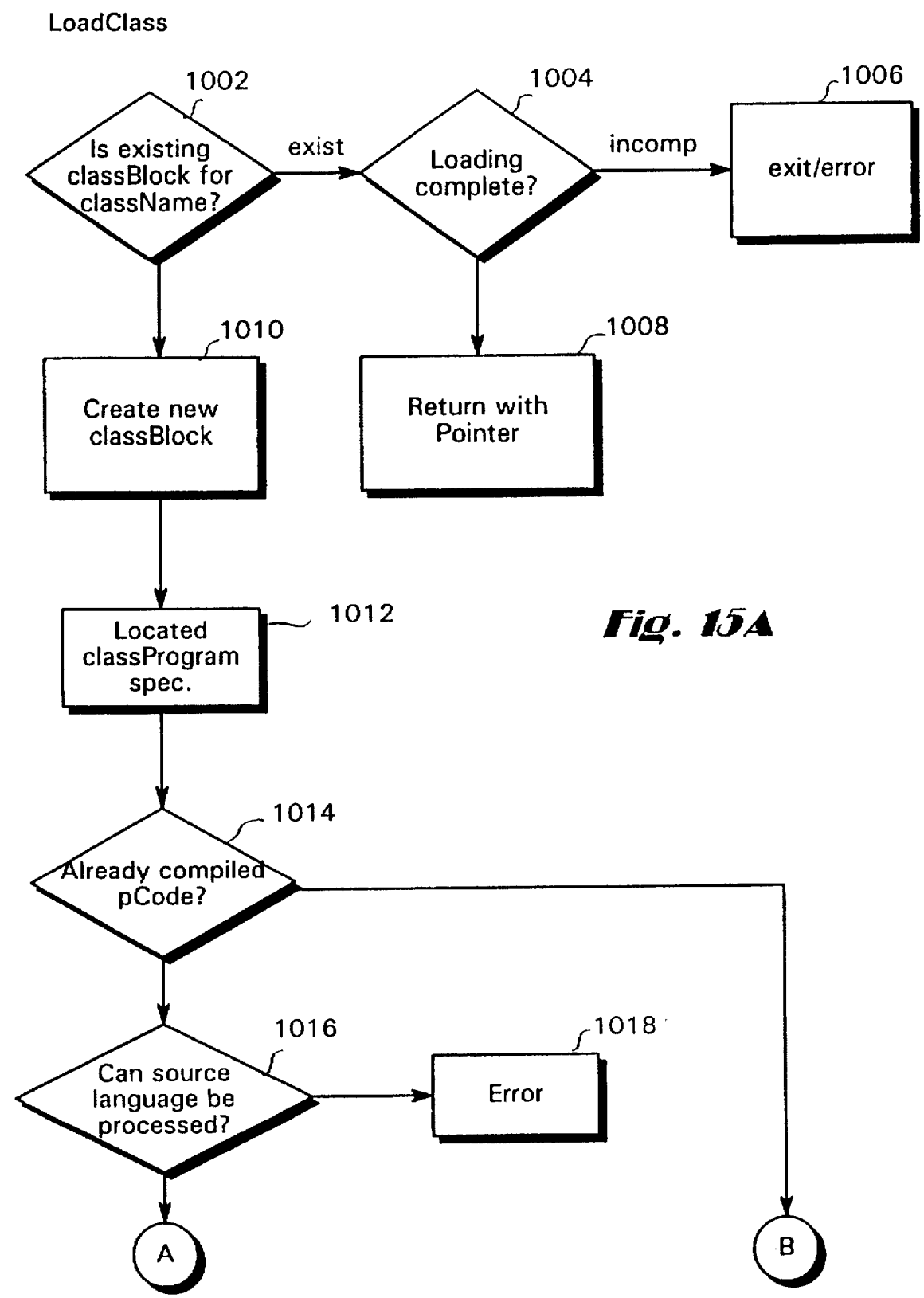
FIGS. 15A and 15B are flowcharts delineating the sequence of operations in the load class routine.
Figure 15B:
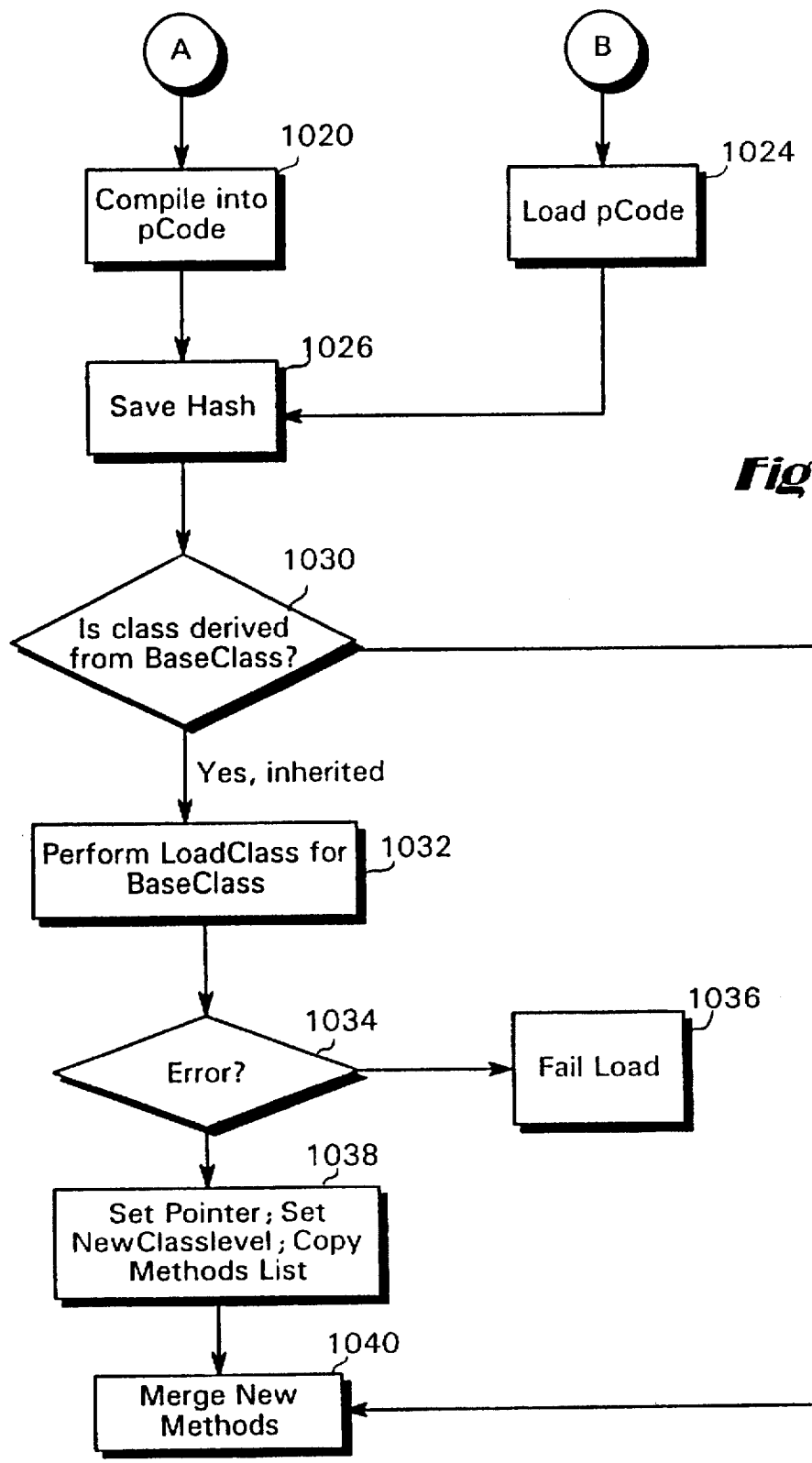

FIGS. 15A and 15B delineate the sequence of operations used to load a class. It is used to load into storage a class program which is not known to have been specifically used before. The parameter "className" is the name of the class to be loaded. It is possible that this may also be accompanied by a file or a library access information. The load class program begins by initially determining (block 1002), if the existing block already exists for the specified class name in storage. If it does exist in storage, then a check is made in block 1004 to determine if the loading has been complete. If the loading is incomplete, then the routine is exited with an error indication. This test determines whether the program is its own ancestor to thereby detect circular inheritance which generates an error condition (1006). If the loading has been completed, then in block 1008, the routine returns with a pointer to the classBlock. If the check in block 1002 reveals that the program is not in storage, then a new classBlock must be created corresponding to the respective class load. This block will be deleted in case of loading failure.

The classBlock is connected to the class list and a check is made to determine whether the classBlock is incompletely loaded to detect for circular inheritance errors.

Thereafter, the routine proceeds to block 1012 to locate the class program specification in the local environment, e.g., search libraries, files, etc. After locating the program specification in block 1012, in block 1014, a check is made to determine whether the specification represents already compiled p-code that is processable by the current version of the compiler. If so, then the routine branches to block 1024 where the p-code is loaded into storage. If the check in block 1014 indicates that the specification does not represent already compiled p-code, then a check is made in block 1016 to see whether the specification reflects source language that can be processed by the compiler. If the specification reflects source language that cannot be processed by the compiler, then the routine is exited and an appropriate error message is generated (1018).

If the source language can be processed, then the routine proceeds to block 1020 where the source code is compiled into p-code using an appropriate translator. As the p-code is loaded into storage, a hash is computed. A check is made to insure that the version of the compiler that created the p-code is compatible with the current executor. The hash of the original source program (or normalized version thereof as stored in the p-code) is copied into the classBlock. It is also possible that the source code itself may be saved. The class authorization assigned to the p-code is thereafter established, as will be explained further below.

After the processing in blocks 1020 and 1024, the hash of the p-code in the classBlock is saved (1026). Various information is also supplied concerning the p-code to the classBlock including the hash of the associated p-code, the address of the start of the pseudo instructions, address of the start of the overall p-code. It is assumed that the class level (which is the number of classes in the aggregate class lineage) is equal to one.

A check is then made in block 1030 to determine whether the class is derived from a base class. If the class is not derived from a base class, then the routine branches to block 1040 for merging new methods into the list associated with the classBlock which will be explained further below. If the class is derived from a base class, then the load class routine is performed again for the base class (1032). A check is made at 1034 to determine whether there is an error in the perform load class execution and, if so, then an error routine is executed in 1036, due to the failure to load the current class. If no error is detected, then, at this point, the current class and the parent or base class have been loaded (as well as the parent's parent class).

In block 1038, a pointer is set to the base classBlock to show that the new classBlock is an extension of the base classBlock. Additionally, the new class level is set to one greater than that of the base to reflect the number of classes in the lineage. Additionally, the methods list is copied from the base class to the new classBlock. Processing continues at block 1040 where the new methods are merged into the list associated with the classBlock (there may be existing methods already loaded from the base class). This merging includes locating the explicit start of the p-code instruction for each method.

If new methods duplicate existing methods (which have been already loaded from the base or parent class) then substitute the new methods as substituted. Whatever other aggregate data is needed for this classBlock is supplied. The incompletely loaded indicator is cleared now that all aspects are loaded and the routine returns to classBlock pointer.

FIG. 16 is a flowchart delineating the sequence of operations in establishing a class authorization. The routine authenticates and verifies the authorization of the class as it is loaded. This applies to classes loaded in either source format or compiled p-code format. Parameters used in this routine are the hash of the associated source or p-code image, the type of structure (source code language or p-code), the digital signature structure for the class definition, and the classBlock associated with the associated class. The routine returns the authorization structure for this code (or an error if the authorization definition or signature is invalid).

The routine begins processing at block 1302, wherein it is determined if the signature is correct for the supplied hash value. If the signature is not correct, then an error is indicated (1304). If the signature is correct, then a check is made at block 1306 to determine whether the type of structure is as indicated in the signature block. If there is a failure to match, then in block 1307 an error routine is invoked. If the type of structure is as indicated in the signature block, processing continues at block 1310. One or more checks are made at 1310 to determine whether the signature reflects the explicit authorization that has been assigned to this class. If so, then it is determined that the signer is trusted. This check can be made in several ways.

First, the test can be made by testing if the public key belongs to a trusted party. Authorization can be determined by testing if the certificate belongs to a trusted party or by determining that the signer has been delegated authorization through certification or delegation by a higher (trusted) authority. Tests could include direct comparison, comparison of hashes, comparison of identification indicia, etc.

If explicit authorization is not specified, then in some environments, it may be appropriate to infer authorization by virtue of information known about the signer's certifiers. Further details of such tests and how authorization can be delegated are indicated in applicant's U.S. Pat. No. 5,005,200, which patent is herein incorporated by reference. The digital signatures may imbue authorization in a number of possible ways, including being signed by a specific public key or a certificate recognized by the current user, by being signed using a private/public key having in its certification hierarchy a trusted entity's public key or a certificate, or being signed with explicit assignment of program authorization using a protocol such as electronic document authorization as described in the methodology of the applicant's U.S. Pat. No. 5,005,200.

If it is determined by the checks in blocks 1310 that the signer is trusted, then processing continues at block 1320. If trustable authorization is determined or can be inferred, then the digital representation of this authorization is stored in a structure accessible from the classBlock. If there is a failure in validation, so that the authentication and/or authorization cannot be confirmed, then the appropriate action (depending upon the precise failure, the environment, the implementation and the user configuration, etc.) must be taken, including suppressing use of the class or assigning a default authorization.

Depending upon the implementation, various exceptional actions may be necessary depending upon whether the code is not signed, the signature is invalid, or the signer's authorization is not recognized. It may be appropriate to halt execution or merely assign minimal (default) authorization to the incorrectly or unsigned class definition. The authorization information established in the routine described in conjunction with FIGS. 16 incorporates the program authorization information data structures described and utilized in applicant's above-identified program authorization information copending application.

Figure 17:
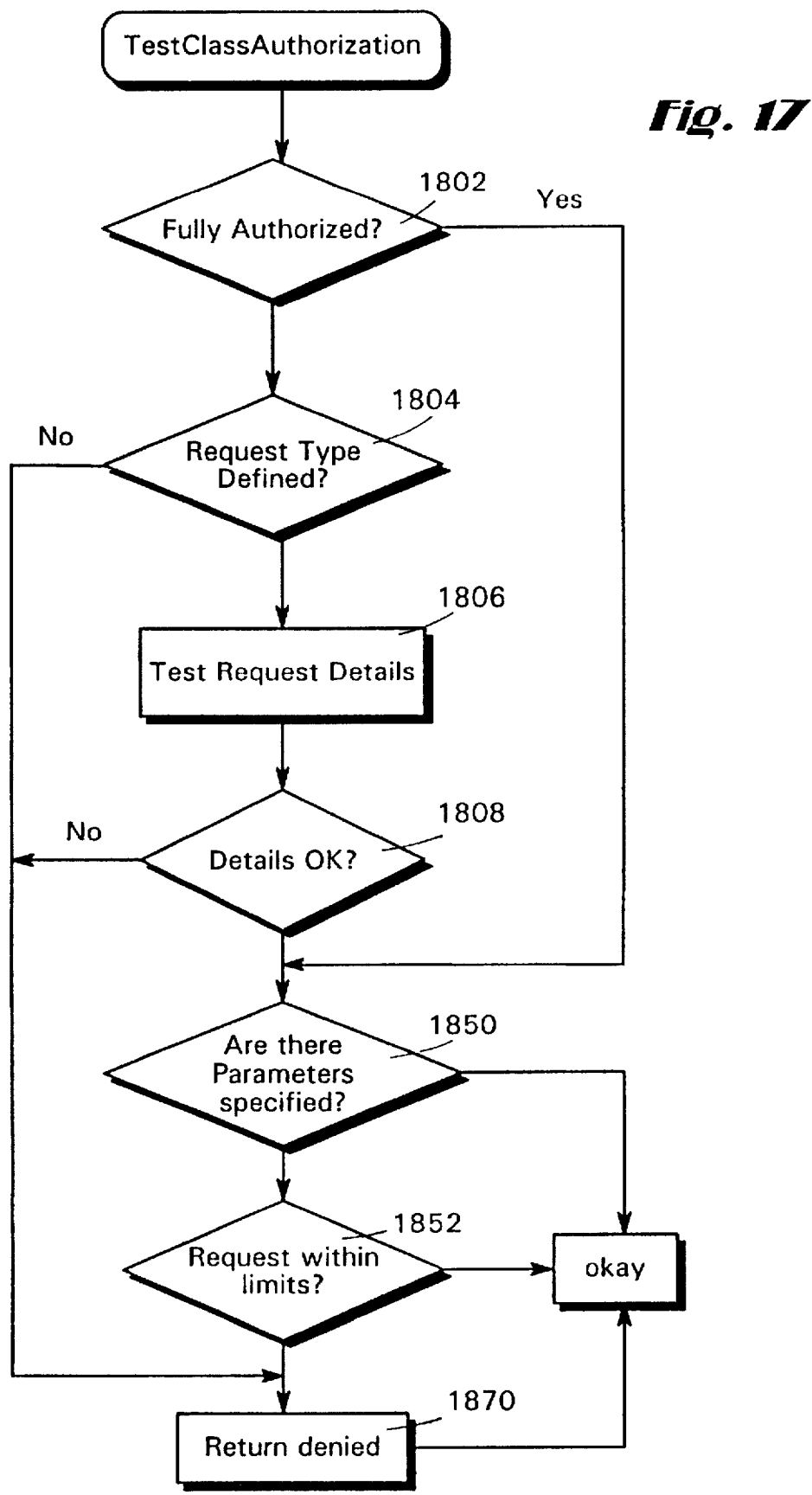
FIG. 17 is a flowchart delineating the sequence of operations of the test class authorization routine which tests to insure compliance with the program authorization information.

FIG. 17 is a flowchart delineating the sequence of operations of the "test class authorization" routine which tests to insure compliance with the program authorization information. This routine is invoked by various functions within the interpreter/executor whenever a sensitive operation is requested by an instance. Input consists of the specification of the type of function including details such as the full file name, etc. The input is usually presented as type of request, request details. This requested operation is checked against the authorization obtained when the class was loaded and a determination is made as to whether the operation is permissible.

A check is made in block 1802 to determine if the class is "fully" authorized (i.e., any function is permitted). If the routine is fully authorized, then the routine branches to block 1850. If the class is not fully authorized to perform any sensitive operation, then processing continues at block 1804 to determine if the request type is defined within the program authorization information structure. If the request type is not defined within the authorization structure, then the routine branches to block 1870 where the request is denied for execution. If the check in 1804 indicates that the request is defined then the routine tests for details of the request against the authorization structure (1806). A check is made at block 1808 to determine if the request details fail the test. If so, then the routine branches to block 1870 to return a "denied" response. If the request details are okay, then a check is made at block 1850 to determine whether there are parameters specified by the interpreter/executor to impose an upper limit on the authorization that may be exercised by this (or perhaps any) cell. If there are no parameters specified, then the response "okay" is returned. If the request is within any imposed limits, then the return "okay" is provided.

Figure 18A:
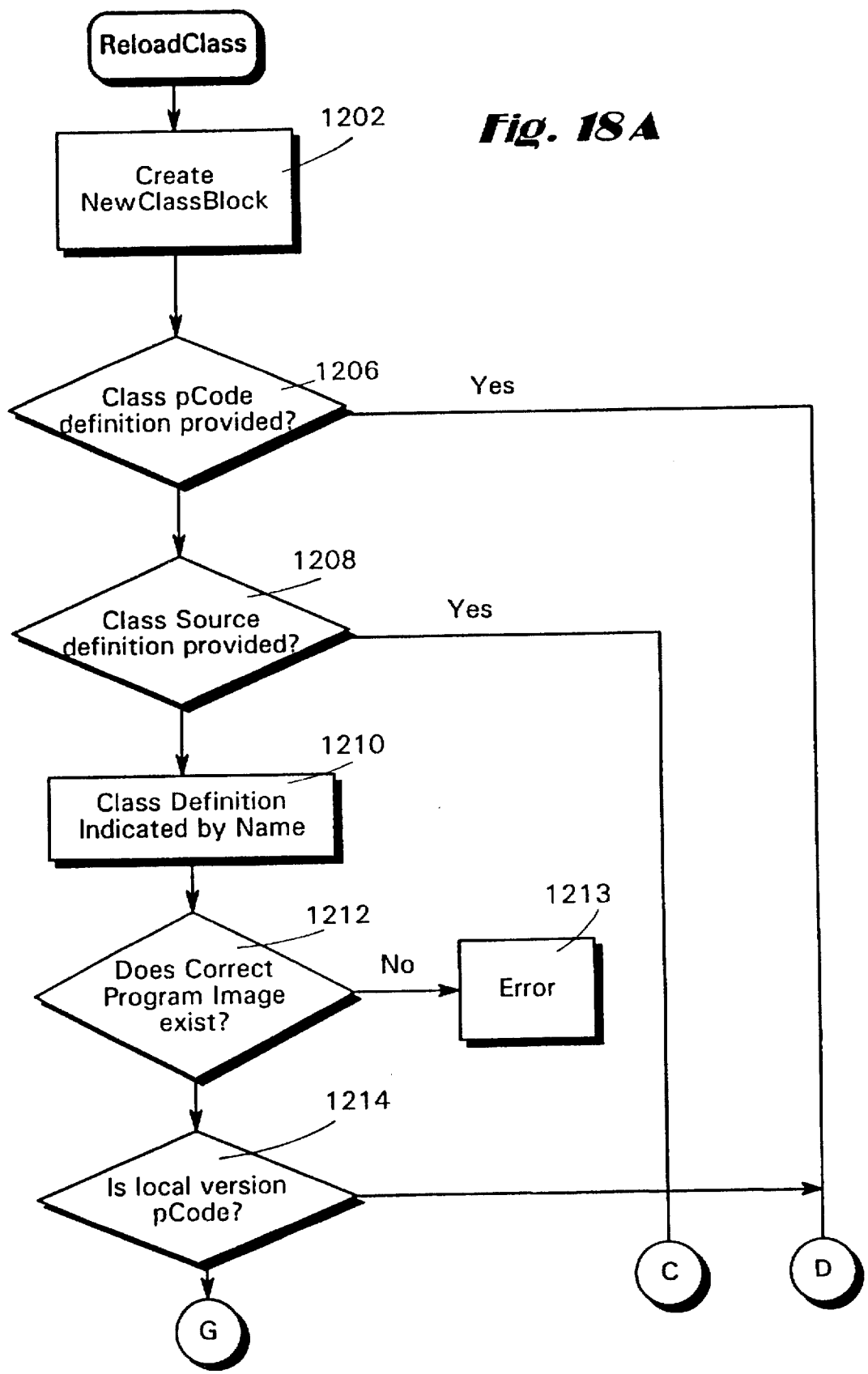
FIGS. 18A, 18B and 18C delineate the sequence of operations performed by the reload class routine.
Figure 18B:
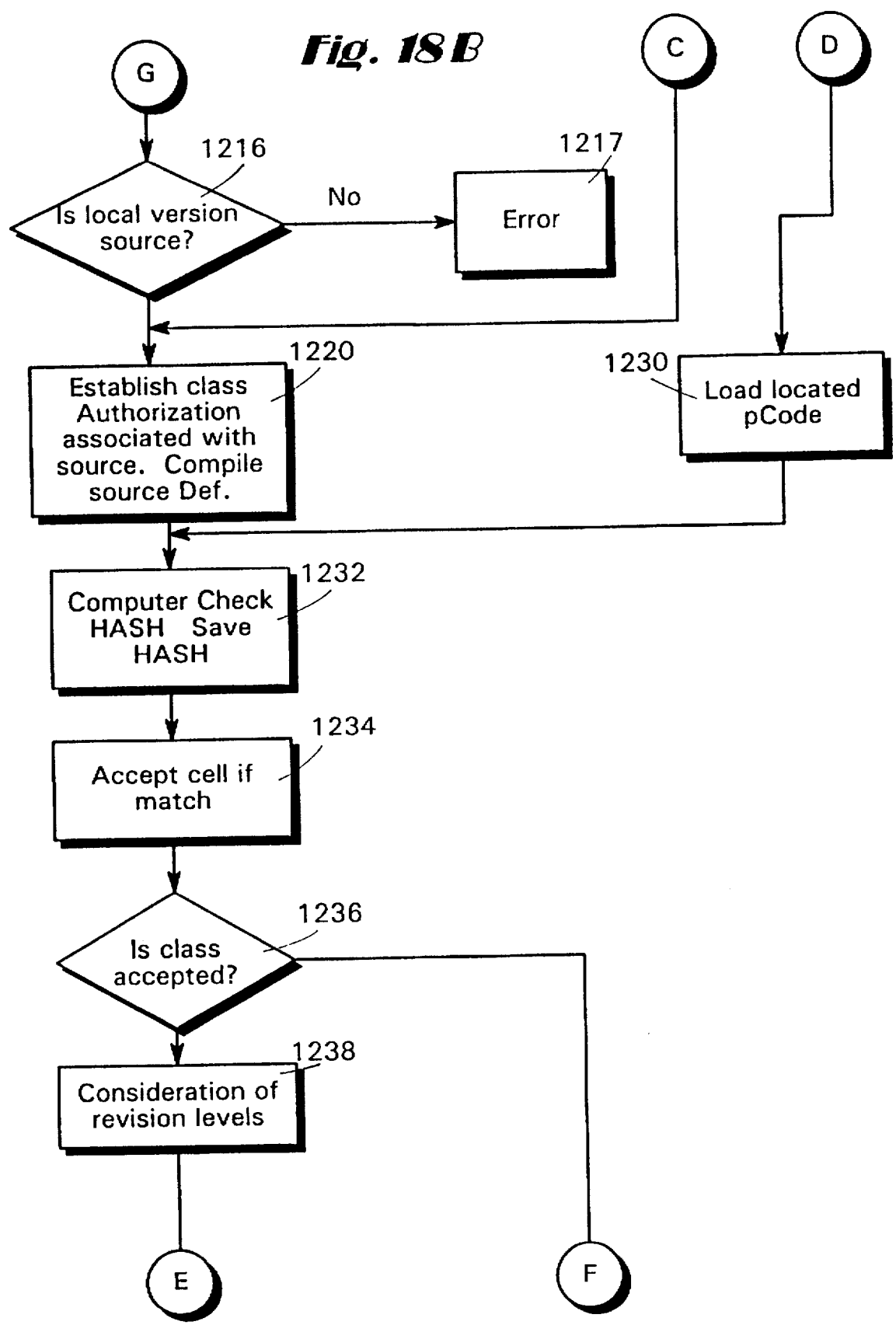
Figure 18C:
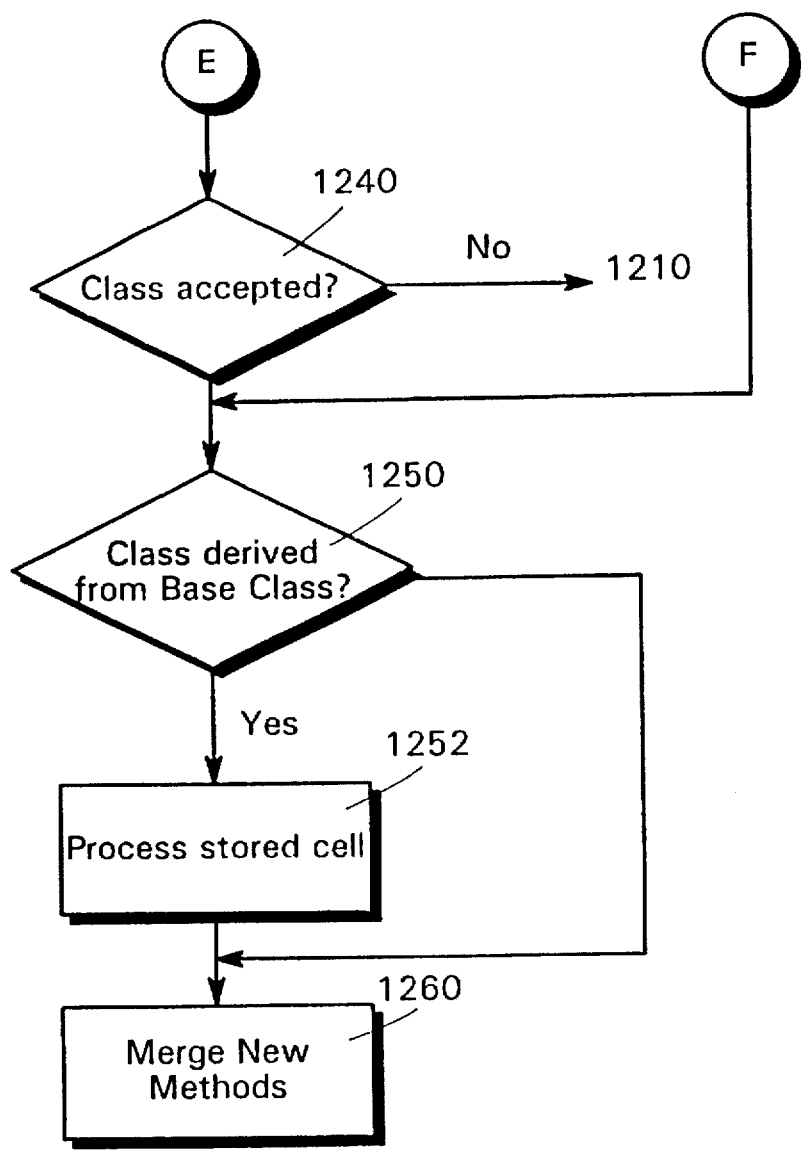

FIGS. 18A, 18B and 18C delineate the sequence of operations performed by the "reload class" routine. This routine restores the class definition for a class which is associated with a stored instance in the cell and for which either the p-code and the source code are known. This particular class definition is already associated with an existing instance in the cell. The classes are stored in a cell so that the base class definitions precede all classes which extend them.

In reloading a class, it is necessary to reestablish the class exactly as it existed before. The reload class routine begins at block 1202 where a new classBlock is created which corresponds to the prospective load (block will be deleted in case of failure). The classBlock is connected to the class list and an indication is made as to whether the classBlock is incompletely loaded as previously described to detect circular inheritance.

A check is made at block 1206 to determine whether class p-code definition is already provided in the cell. If so, then the routine branches to block 1230 and processes the p-code image as carried in the cell. If the p-code definition is not present, then a check is made to determine if the class source code definition is provided in the cell. If so, then the routine branches to 1220 and processes the source image as carried in the cell. If neither the p-code nor source code is present then the routine proceeds to block 1210 where the class definition is indicated by program name, by program version, by p-code and source hash. The name (and possibly the hash) of the class is used to locate (another) local copy of the p-code or the source.

As indicated at block 1212 a test is made to determine whether the correct program image exists. If the correct program image does not exist, then the routine branches to 1213 and generates an error indication. If the correct program image does exist, then a check is made at block 1214 to determine if the local version of the class is p-code. If so, then the routine branches to block 1230. If the local version is not source code as determined in block 1216, then it is determined, than an error has occurred, and processing continues within an error routine at block 1217.

If the source code has been located, then at block 1220, it is compiled and the hash of the source is computed. If the computed source hash matches that defined in the authenticated aspect of the cell, then the class is accepted. It is possible that the source hash is based not on the exact source, but rather a normalized form, for example, with the comments removed and nonessential spacing deleted. Thereafter, in block 1220, the class authorization is established associated with the source code. The source definition is compiled using whatever compiler is appropriate to the source definition if multiple languages are supported.

Processing then continues in block 1232. If the prior processing involved a block 1230, then the located version of the p-code is loaded from the local file repository or within the cell itself. The hash of the p-code is computed as it is loaded. A check is made to ensure that the precompiled p-code is in a format eligible for being processed by this interpreter/executor and the class authorization is established that is associated with the p-code. A check is made to determine whether the computed hash of the p-code equals the expected value as defined in the authenticated part of the cell. If there is a match, then the class is accepted. If not, an error indicator is generated. The processing at 1232 additionally saves the hash of the original source which is given in p-code.

In block 1234, if the given hash of the original source code matches that specified in the cell's p-code class definition, then the cell is accepted. A check then is made at block 1236 to determine if the class is accepted. If the class is accepted, then processing continues at block 1250. At block 1238, processing steps are implemented which consider alternate program class revision levels. This processing allows, if desired, for a substitute version of the program—therefore, the hashes of the source or the p-code cannot match, so compatibility is based on explicitly stated version/revision fields.

The routine compares the revision/version level of the class program as defined (and used) in the cell with the range of revision/version levels stipulated with the program image which is being processed (as found in local repositories or inserted into the cell). If the revision/version level used in the cell instance data falls into the category supported by the level of the program, then the program is allowed to be used.

It may also be useful in some embodiments to ensure that the different program is digitally signed or authorized by the same entity that was responsible for the revision/version associated with the instance. In this case, the digital signature of the cell reference must also carry the digital signature. The revision/version of the actual program can validly pre-date or post-date that affiliated with the instance.

The most common valid mismatch will be when the program post-dates the instance's version—the program simply carries the information of the older compatibility level it supports. The less apparent case is when the program may actually be created with the stipulation that it supports some range of levels that exceed its own level. This may be reasonable, though possibly not usual, when program upgrades are planned and it is known that future data structures (at least for some range of future program levels) will be compatible with the older program levels.

In block 1240, a check is made to determine if the class is not yet accepted. If the class is not accepted, then processing branches back to block 1210 in an attempt to find another class definition candidate having a compatible description given in the cell specification.

If the class is accepted, a check is made in block 1250 to determine whether the class is derived from a base class. If the class is not derived from the base class, then processing continues in block 1260. If processing is derived from the base class, then the processing continues at block 1252.

In a stored cell (FIG. 10), the associated base class is specifically constructed to precede the extended class—thereby allowing direct determination of the base class-Block. The only check that needs to be done is that it corresponds to the base class name as given in the extension. The base class should already be loaded and is indicated by the current cell specification.

Thereafter, the pointer is set to the base classBlock to show that the new classBlock is an extension thereof. The incremented extension count is set in the new classBlock. Thereafter, block 1252 processing concludes with copying the methods list from the base class to the new classBlock. The routine concludes at block 1260 where new methods are merged (as isolated by p-code) into a list associated with the classBlock in the same manner as the merged new methods processing was accomplished in block 1040 associated with the load class routine described in FIGS. 15A and 15B.

Figure 19:
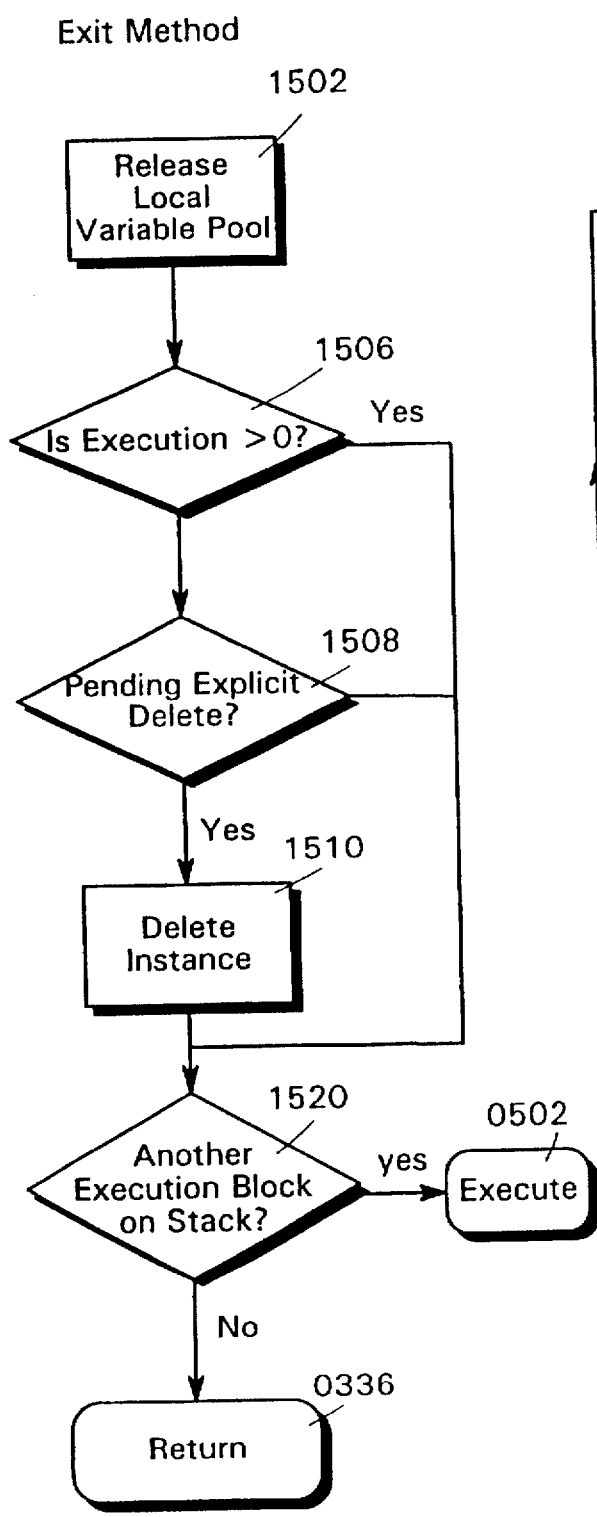
FIG. 19 is a flowchart delineating the sequence of operations and the exit method function.

FIG. 19 is a flowchart delineating the sequence of operations in the "exit method" function. This function is driven by an exit or return from a method. The current executive block is terminated and control is passed to the previous execution level. If an instance is deleted (either explicitly through the delete built-in function or implicitly when no more variables reference the instance) while it is still executing, then "delete pending" flag is set and the delete will be cleaned up as soon as all currently active methods (execBlocks) terminate. Once in this state, it is up to the implementation as to whether additional activations can be directed against this instance, or whether there should be a way for the instance to reinstate itself (perhaps by assigning its instance to another variable). An implementation could even allow an "undelete" to clear such a pending delete state.

Turning to block 1502, the built-in function releases the local variable pool associated with the execBlock. The execBlock is removed from the top of the execution stack and release storage. Thereafter, the instance's block execution use count is decremented. A check is then made at block 1506 to determine whether the execUse is greater than zero. If so, the routine branches to block 1520. If the execUse is not greater than zero, then a check is made at 1508 to determine whether there is a pending explicit delete (the variable use count equals zero). If so, then in block 1510, the instance is deleted.

A check is then made at block 1520 to determine whether there is another execution block on the stack. If so, then the routine branches to block 502 to execute the instructions. If not, the routine execution ends and the routine returns to block to 336 in the initial interpreter/executor activity processing.

Figure 20:
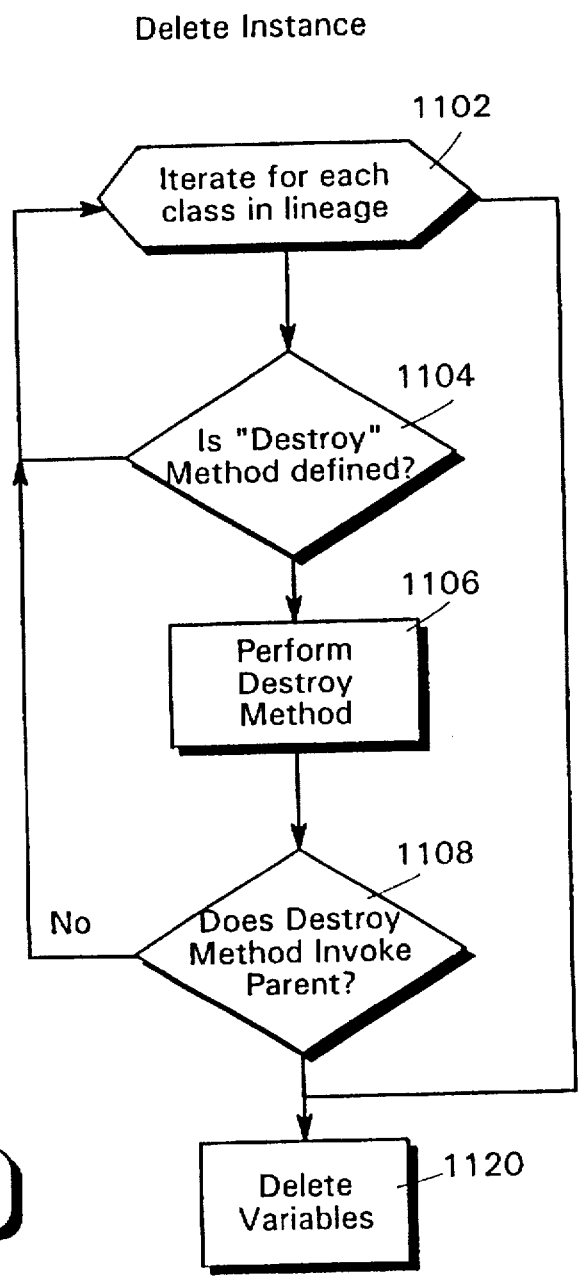
FIG. 20 is a flowchart delineating the sequence of operations for the delete instance built-in function.

FIG. 20 is a flowchart delineating the sequence of operations for the "delete instance" built-in function. An instance is deleted when all references to it are unassigned or when it is explicitly deleted with the "delete" built-in function. Delete instance processing begins at block 1102 where iterations for each class in the lineage are set up starting with the youngest. After the iterations, the routine branches to block 1120. A check is made at block 1104 to determine whether there is a destroy method defined specifically for this class (not simply inherited). If there is no destroy method defined by the class, then the routine branches back to 1102 of the iteration processing. If there is a destroy method defined specifically, then the specific destroy method is performed at block 1106. Thereafter, a check is made at block 1108 to determine if this destroy method invoked its parent's destroy method. If the destroy method did not invoke its parent's destroy method, then the routine branches back to block 1102 for iteration. Thereafter, processing continues at block 1120 where variables are deleted in all private pools from youngest to eldest in class lineage. Additionally, variables in the shared pool are deleted. The classAct is decremented, which is the count of active instances for associated classes. Additionally, the cell ACT variable is decremented, which is the count of active instances in the cell.

Figure 21:
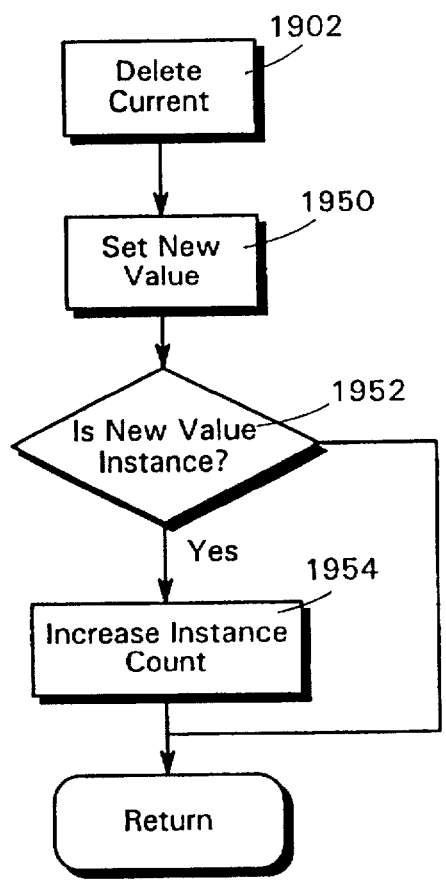
FIG. 21 is a flowchart delineating the sequence of operations in the reset variable value routine.

FIG. 21 is a flowchart delineating the sequence of operations in the "reset variable" value routine. This logic is used whenever the value of the variable is reset. In block 1902, the current value is deleted. Thereafter, in block 1950, the new value is set. A check is then made (1952) to determine if the new value is an instance. If the new value is an instance, then processing continues in block 1954, wherein the instance UseCount is incremented. If the new value is not an instance, then the routine returns to the calling routine.

Figure 22:
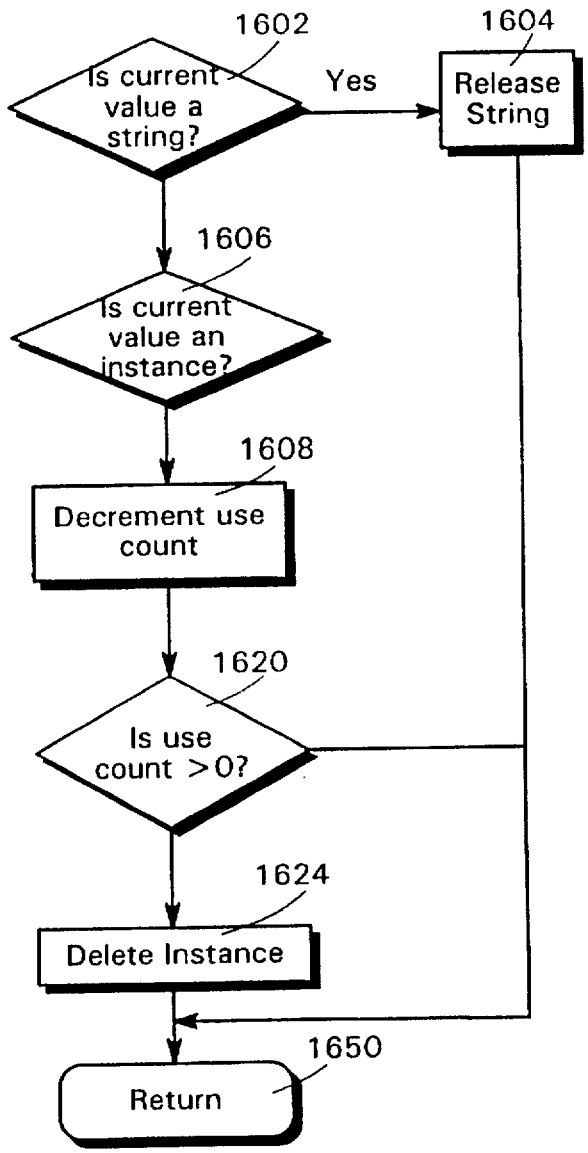
FIG. 22 is a flowchart delineating the sequence of operations performed in deleting a current value.

FIG. 22 is a flowchart delineating the sequence of operations performed in deleting a current value. In block 1602, a check is made to determine if the value's current value is a string. If the current value is a string, then the string is released (1604) and the routine branches to block 1650. If the check in block 1602 reveals that the current value is not a string, then a check is made in 1606 to determine if the variable current value is an instance. If so, then the instance UseCount is decremented (1608). Thereafter, a check is made to determine if the instance UseCount is greater than zero. If the instance UseCount and the instance execCount are greater than zero, then the routine branches to 1650. If the instance UseCount is not greater than zero, then the instance is deleted in block 1623. Return is made to the calling routine (1650).

The present invention additionally contemplates various other restore operations which have not been heretofore specifically addressed. For example, a restore instance routine is contemplated in which the associated classBlock (which is already established) is located. The instance is then connected to the associated classBlock, and the associated cell block. The shared variable pool for the instance is restored as is the private variable pool.

Pools may be restored by connecting each variable to the associated pool definition header and connecting each variable to its assigned value, if any. Values may be restored as follows: for string values, a value block is created with a specified string value. For instance values, a value block is created referring to the associated instance. In the preferred embodiment, the information controlling the instance, i.e., pools, class pointers, etc., is stored directly in the instance value block. The restore instance function is utilized for instance values.

With respect to restarting an instance being reloaded (after all variables, etc., have been attached), if the class was digitally signed, then the signature is verified, and any execution authorization bound with the signature is stored in conjunction with the class definition. If the class is derived, then the base class is also located (it may already be loaded) and loaded if necessary.

With respect to loading a subcell the following operations may be performed:
ReloadCell
create an instance value for the face instance of the subcell return this instance to the caller.
The caller can then invoke the instance value as if it were any other instance.
The dispatcher uses the cell associated with the instance to determine which global pools is affiliated with references to global variables.

The invention is designed to allow complete cells to be invoked and logically encapsulated within other cells. Such "interior" cells are known as "subcells." In the present implementation of the invention, each subcell has its own distinct global variable pool shared by the instances within the cell. It is possible in alternate implementations to share the global pool among all subcells, however, this would require handling collisions of global variables when two cells are combined (when one cell is invoked by another, and they both contain similarly named global variables) such that one version of the variable is overlaid by another.

Turning now to verifying critical operations, we first consider verifying a class. The class definition, especially one performing sensitive operations, is digitally signed by an authority trusted by the population sharing the class definition. Depending on the implementation and circumstances, the signature may stipulate (in various ways) the explicit or implicit authorization which is granted to the class. The class definition may be signed in either source form or p-code form, or both.

Class definitions which are not signed are supplied a default (usually minimal) authorization which inhibits them from participating in sensitive operations. Alternatively, in some implementations, it may be appropriate to treat an unsigned or unauthorized class as entirely invalid and not permitted to execute.

Digitally signing class definitions inhibits the possibility that bogus or Trojan horse classes could be used to performed mischief. Sensitive functions, at least, must be protected. In some environments, it may be desirable to insure that all classes are explicitly authorized. The preferred embodiment of the invention allows the trust criteria to be decided by the individual user or the user's organization.

The hash of the class definition program (in source or p-code form, as appropriate) is computed as it is loaded. This hash, combined possibly with other authorizing information, is validated using digital signature(s).

Techniques from applicant's Program Authorization Information application should be understood as applying to object class definitions. This allows specific designation of the functions which a cell is permitted to execute.

With respect to validating a cell, signing a cell as it is stored or transmitted to another user inhibits the possibility that it could be altered by error or by a malicious adversary. (Even if it is tampered with by the sender then this can be later proven).

In the preferred instantiation of the invention, only essential parts of the cell are signed, including: the name, hash and other identifying references to the various classes; the variable pools, the variables and values and their mutual relations and their relationship with the various classes, instances, and pools and variables.

The class definitions themselves need only be signed by proxy (by name, other identifications and/or hash values), and may thus be safely appended or removed from the stored cell without invalidating the overall digital signature. However, by having the class programs validated by their hashes, this insures that an incorrect, altered or tampered version cannot be substituted. This provides flexibility with security.

With respect to validating a sensitive function, some (built-in) functions as well as any "arbitrary" assembler language (or other function which can affect the system) operating outside of the invention's interpreter/executor, are potentially sensitive and require trust on the part of the class which invokes such functions. The invention enforces security by suppressing any function activity deemed sensitive, unless the instance requesting the function is associated with a class authorized to perform the function. If a trusted class invokes sensitive functions using information originating in untrusted ways (such as a parameter from an untrusted caller; or the result of invoking another (possibly untrusted) instance), then the trusted class is obliged to validate the information obtained from any source not known to have the same level of authorization trust (or higher).

Some sensitive built-in functions include: reading, writing, creating and erasing files, performing digital signatures. Any use of "external" modules or functions written in assembler, or which operate in some other way outside of direct monitoring of the invention's interpreter/executor, must also be considered potentially risky. Such functions should be isolated into trusted classes and appropriately authorized. If these are properly written, then such trusted classes can then be used by other normal (untrusted) classes to access these risky capabilities.

Other variations and modifications to the exemplary embodiment(s) will be apparent to those skilled in the art while yet retaining some or all of the novel features and advantages of this invention. All such variations and modifications are intended to be included within the scope of the appended claims.

What is claimed is:

1. In a communications system having a plurality of digital computers coupled to a channel over which computers exchange digital messages, a method for processing information among said computers comprising the steps of:
   executing on a first computer a travelling program comprising a sequence of digital program instructions including instructions which determine at least one next destination that receives the sequence of instructions, said sequence of instructions defining a plurality of related object instances which are bound together; and
   transmitting to said next destination digital information comprising at least said plurality of object instances together with accompanying digital data associated with said sequence of instructions.

2. A method according to claim 1, wherein said travelling program contains the actual program defining a class associated with at least one of said plurality of object instances.

3. A method according to claim 1, wherein one of said plurality of object instances is designated as the instance which receives control when the travelling program is itself invoked as an object.

4. A method according to claim 1, wherein a program which defines a class of at least one of the constituent object instances, is included as part of the travelling program.

5. A method according to claim 4, wherein the included program is represented in source form.

6. A method according to claim 4, wherein the included program is represented in compiled form.

7. A method according to claim 1, further including the step of including an indication of a program defining a class of at least one of the plurality of object instances.

8. A method according to claim 7, wherein the indication of the program which defines the class of at least one of the constituent object instances, includes a reference to a hash of the program.

9. A method according to claim 8, wherein the hash is taken of a version of the source program.

10. A method according to claim 8, wherein the hash is taken of a compiled version of the program.

11. In a computer system having at least one computer having a main memory, a method of operating said computer system comprising the steps of:
   loading a digital data structure in memory relating to a predetermined data type which includes digital data identifying a function which can be applied to said predetermined data type and identifying at least one program which controls how to manipulate digital data of said predetermined data type; and
   transmitting at least a portion said digital data structure to a next destination for processing.

12. A method according to claim 11, wherein said computer system includes a disk memory, said loading step includes the step of using a file stored on said disk memory to create a related internal control block data structure in said main memory.

13. A method according to claim 11, wherein said step of loading further includes the step of identifying in said data structure variables which are used by said at least one program.

14. A method according to claim 11, wherein said step of loading further includes the step of storing an indication of a program responsible for handling requests relating to said digital data structure.

15. A method according to claim 11, wherein said step of loading further includes the step of storing indicia identifying programs associated with said digital data structure.

16. A method according to claim 11, wherein said step of loading further includes the step of storing an indication of at least one digital signature associated with said data structure.

17. A method according to claim 11, wherein said at least one program includes a plurality of distinct instance programs.

18. A method according to claim 11, wherein said step of loading includes the step of defining a pool of variables which are shared among a plurality of programs.

19. A method according to claim 11, further including the step of identifying a program instance as a variable in said data to thereby permit an entire program to be manipulated through an instance designator.

20. A method according to claim 11, further including the step of digitally signing at least a portion of the digital data structure to be transmitted.

21. A method according to claim 20, wherein the digitally signed data contains at least a hash of at least one digital program.

22. A method according to claim 11, wherein the identifying of at least one program includes a plurality of program references, such that at least one program reference is associated with an indication of a hash of the associated program.

23. A method according to claim 22, wherein said hash is a hash of a compiled version of the associated program.

24. A method according to claim 22, wherein said hash is a hash of the source program of said associated program.

25. A method according to claim 11, wherein said step of loading includes the step of defining at least one program related data structure.

26. A method according to claim 25, wherein said program related data structure includes a pointer identifying the next program to be invoked by the program identified in the program related data structure.

27. A method according to claim 25, wherein said program related data structure includes a program structure data block whose fields are constant regardless of the hardware platform executing the program.

28. A method according to claim 27, wherein said program structure data block includes the p-code instructions of the identified program.

29. A method according to claim 11, further including the steps of constructing at least one additional program characteristic identifying digital data structure relating to said at least one program.

30. A method according to claim 29, wherein said step of constructing a program characteristic identifying digital data structure includes the step of identifying the parent program from which said at least one program is extended.

31. A method according to claim 29, wherein said step of constructing a program characteristic identifying data structure further includes the step of storing indicia identifying authorization information defining operations which the identified program is authorized to perform.

32. A method according to claim 29, wherein said step of constructing a program characteristic identifying data structure includes the step of identifying the functions which may be performed by said at least one program.

33. A method according to claim 32, wherein the step of identifying the functions includes the step of identifying the starting address of the program code which implements an identified function.

34. In a communications system having at least one computer and a memory, a method of operating said computer comprising the steps of:

loading a digital cell in said memory comprising a digital data structure that identifies a class definition and a collection of related object instances which are bound together by said class definition, and transmitting by said at least one computer at least a portion of said digital cell and class definition identifying data structure to a next destination.

35. A method according to claim 34, wherein said class definition identifying data structure includes a class definition defining program.

36. A method according to claim 34, wherein said digital cell is part of a digital data structure which includes instructions for transmitting itself to said next destination.

37. A method according to claim 34, wherein said transmitting step includes the step of transmitting a portion of said digital cell to another user via electronic mail.

38. A method according to claim 34, further including the step of permitting said digital cell to be invoked and processed as an object by at least one other digital cell.

39. A method according to claim 34, including the step of invoking said digital cell and processing it as an object by at least one other digital cell.

40. A method according to claim 34, further including the step of dynamically determining the class for objects which are processed.

41. A method according to claim 34, further including the step of storing the program logic defining object classes as part of a stored cell.

42. A method according to claim 34, wherein said digital cell includes a collection of object instances whose execution can be suspended and stored as a file.

43. A method according to claim 34, wherein said step of loading includes the step of storing said digital cell in a file in a mass storage device; and further including the step of using the stored digital cell to create at least one internal control block used during program execution by an operating system program.

44. A method according to claim 34, wherein the identification of a class definition identifies multiple distinct class definition programs.

45. A method according to claim 34, wherein the identification of a class definition is accomplished by the step of referencing constituent class definition programs by hash value.

46. A method according to claim 34, further including the step of validating at least one class definition with a digital signature.

47. A method according to claim 34, wherein said digital cell is a travelling object oriented program, and further including the step of performing validating digital signatures.

48. A method according to claim 34, wherein said digital cell is a travelling object oriented program, further including the step of constructing electronic data interchange data structures.

49. A method according to claim 34, further including the step of digitally signing at least a portion of said digital cell.

50. A method according to claim 49, wherein the step of digitally signing includes the step of digitally signing at least one class definition program.

51. A method according to claim 34, further including the step of dynamically determining associated methods for objects which are processed.

52. A method according to claim 44, wherein said associated methods are determined by string values.

53. A method according to claim 34, wherein said related object instances store indicia for locating an associated class definition program.

54. A method according to claim 53, wherein a related object instance is bound to the class definition program as it existed at the time the object instance was created.

55. A method according to claim 53, wherein a related object instance is associated with specific versions of the class definition program.

56. A method according to claim 34, wherein said digital cell stores authorization information defining operations which an associated class is authorized to perform.

57. A method according to claim 56, including the step of digitally signing the portion of said digital cell associated with defining operations which an associated class is authorized to perform.

58. A method according to claim 56, wherein the class is determined by string values.

59. In a communications system having at least one computer and a memory, a method of operating said computer comprising the steps of:

loading a digital cell in said memory comprising a digital data structure that identifies at least one class definition and a collection of related programs which are bound by said class definition, said digital data structure including instructions for transmitting at least a portion of itself to a next destination; and transmitting at least a portion of said digital cell including class definition identifying data structure to a next destination.

60. A method according to claim 59, wherein the related programs are identified by their hash values.

61. A method according to claim 59, wherein the related programs are object oriented programs and further including the step of saving a portion of an object oriented program so it can be executed at a later time.

62. A method according to claim 59, further including the steps of:

accessing said digital cell;

saving said digital cell in said memory; and inserting at least one program definition after the cell has been saved.

63. A method according to claim 59, further including the step of digitally signing at least one of said related programs so that it can perform sensitive functions.

64. A method according to claim 63, wherein said step of digital signing includes the step of signing the hash of one of said related programs.

65. A method according to claim 59, further including the step of modifying one of said related programs.

66. A method according to claim 65, further including the step of checking to determine if the program modification is compatible with the data of existing instances of the program to be modified.

67. A method according to claim 65, further including the step of storing a revision level indication of said class definition and determining whether the modification is compatible with the revision level.

68. In a communications system wherein a plurality of users of one or more digital computers exchange digital messages on behalf of said users, a method for processing information among said computers comprising the steps of:

associating with a traveling program cell a plurality of object instances, at least one of said object instances having data contained in the cell, said traveling program cell comprising a sequence of digital program instructions including instructions which determine at least one next destination that receives the sequence of instructions;

associating with each object instance a plurality of program instructions;

computing a cryptographically secure hash value which depends, at least in part, on at least one of said program instructions;

executing on a first computer a sequence of the instructions associated with at least one object instance in said traveling program cell, wherein at least one of the executed instructions modifies digital data associated with an object instance; and wherein at least one of the instructions determines at least one next destination second computer user to receive the modified traveling program cell after it is transmitted from the first computer user; and transmitting the modified traveling program cell to said next destination second computer user including said digital information comprising at least said plurality of object instances, together with accompanying digital data with indicia of said program instructions associated with each object instance, and wherein at least one data item in at least one of the object instances has been modified by execution in the first computer of the associated program instructions.

69. A method according to claim 68, wherein said traveling program cell contains at least some of said instructions associated with at least one of said plurality of object instances.

70. A method according to claim 68, wherein one of said plurality of object instances is designated as the instance which receives control when the traveling program is itself invoked as an object.

71. A method according to claim 68, wherein the said traveling program cell contains the said computed hash.

72. A method according to claim 68, wherein said hash value is digitally signed.

73. A method according to claim 68 wherein at least one of the said program instructions is represented in source form.

74. A method according to claim 68, wherein at least one of the said program instructions is represented in compiled form.

75. A method according to claim 68, wherein at least one of the said program instructions is represented in p-code form.

76. A method according to claim 68, wherein multiple hash values are computed wherein the at least one hash is based on instructions in source form, and at least one hash is based on the source hash is based on instructions in compiled form.

77. A method according to claim 68, wherein multiple hash values are computed wherein the hash values are based on the same source instructions compiled for different computer architectures.

78. A method according to claim 68, wherein said transmitting step includes the step of transmitting a portion of said digital cell via electronic mail.

79. In a communications system, wherein a plurality of users of one or more digital computers exchange digital messages on behalf of said users, a method for processing information among said computers comprising the steps of:

associating with a traveling program cell, a plurality of object instances, at least one of said object instances having data contained in the cell, said traveling program cell comprising a sequence of digital program instructions including instructions which determine at least one next destination that receives the sequence of instructions;

associating with each object instance a plurality of program instructions;

computing at least one digital signature;

executing on a first computer a sequence of the program instructions associated with at least one object instance in said traveling program cell, wherein at least one of the executed instructions modifies digital data associated with an object instance; and wherein at least one of the executed instructions determines at least one next destination second computer user to receive the modified traveling program cell after it is transmitted from the first computer user; and transmitting the modified traveling program cell to said next destination second computer user including said digital information comprising at least said plurality of object instances, together with accompanying digital data with indicia of said program instructions associated with each object instance, and wherein at least one data item in at least one of the object instances has been modified by execution in the first computer of the associated program instructions.

80. A method according to claim 79, wherein the value of the digital signature depends, at least on part, on at least one of said program instructions.

81. A method according to claim 79, wherein the digital signature is transmitted as part of the cell.

82. A method according to claim 79, wherein the digital signature is stored in a memory device associated with the second user's computer system.

83. A method according to claim 79, wherein the digital signature depends on a source code version of the indicated instructions.

84. A method according to claim 79, wherein the digital signature depends on a compiled version of the indicated instructions.

85. A method according to claim 79, wherein the digital signature depends on a p-code version of the indicated instructions.

86. A method according to claim 79, wherein there is at least one instruction associated with an object instance which is not executed until after the digital signature for its program is verified.

87. A method according to claim 79, wherein the digital signature is verified by at least one computer as being performed by a trusted entity.

88. A method according to claim 79, wherein the digital signature is verified by at least one user as being performed by a trusted entity.

89. A method according to claim 79, wherein there is at least one digital signature having a value which depends on authorization information that defines operations which the associated instructions are authorized to perform.

90. A method according to claim 79, wherein said transmitting step includes the step of transmitting a portion of said digital cell via electronic mail.

91. In a communications system, wherein a plurality of users of one or more digital computers exchange digital messages on behalf of said users, a method for processing information among said computers comprising the steps of:

associating with a traveling program cell, a plurality of object instances, at least one of said object instances having data contained in the cell, said traveling program cell comprising a sequence of digital program instructions including instructions which determine at least one next destination that receives the sequence of instructions;

associating with each object instance a plurality of program instructions;

executing on a first computer a sequence of the instructions associated with at least one object instance in said traveling program cell
wherein at least one of the instructions determines at least one next destination second computer user to receive the modified traveling program cell after it is transmitted from the first computer user;

transmitting the modified traveling program cell to said next destination second computer user including said digital information comprising at least said plurality of object instances, together with accompanying digital data with indicia of said program instructions associated with each object instance, and wherein at least one data item in at least one of the object instances has been modified by execution in the first computer of the associated program instructions; and executing on a least one computer at least one of the instructions associated with at least one object instance in said traveling program cell which causes a digital signature to be performed which depends, at least in part, on the value of data that is associated with an object instance.

92. A method according to claim 91, wherein said performed digital signature is transmitted with the cell.

93. A method according to claim 91, wherein said performed digital signature is verified by at least one computer.

94. A method according to claim 91, wherein said performed digital signature is verified by at least one computer user.

95. A method according to claim 91, wherein said transmitting step includes the step of transmitting a portion of said digital cell via electronic mail.

* * * * *